(12) United States Patent  (10) Patent No.: US 9,117,235 B2
Jebara et al.  (45) Date of Patent: Aug. 25, 2015

(54) BELIEF PROPAGATION FOR GENERALIZED MATCHING

(75) Inventors: Tony Jebara, New York, NY (US); Bert Huang, New York, NY (US)

(73) Assignee: THE TRUSTEES OF COLUMBIA UNIVERSITY IN THE CITY OF NEW YORK, New York, NY (US)

(*) Notice: Subject to any disclaimer, the term of this patent is extended or adjusted under 35 U.S.C. 154(b) by 980 days.

(21) Appl. No.: 12/864,438

(22) PCT Filed: Jan. 26, 2009

(86) PCT No.: PCT/US2009/032070
§ 371 (c)(1),
(2), (4) Date: Nov. 3, 2010

(87) PCT Pub. No.: WO2009/094672
PCT Pub. Date: Jul. 30, 2009

(65) Prior Publication Data
US 2011/0040619 A1  Feb. 17, 2011

Related U.S. Application Data

(60) Provisional application No. 61/023,767, filed on Jan. 25, 2008, provisional application No. 61/029,206, filed on Feb. 15, 2008, provisional application No. 61/122,356, filed on Dec. 12, 2008.

(51) Int. Cl.
*G06Q 30/00* (2012.01)
*G06Q 30/06* (2012.01)
(Continued)

(52) U.S. Cl.
CPC ...... *G06Q 30/0613* (2013.01); *G06F 17/30386* (2013.01); *G06Q 30/0241* (2013.01); *G06Q 30/0247* (2013.01); *G06Q 30/0251* (2013.01); *G06Q 30/06* (2013.01); *G06Q 30/08* (2013.01)

(58) Field of Classification Search
USPC .......................... 705/14.46, 14.4, 14.49, 26.3
See application file for complete search history.

(56) References Cited

U.S. PATENT DOCUMENTS 5,841,958 A  11/1998 Buss et al.
(Continued)

FOREIGN PATENT DOCUMENTS

JP  2006-039955 A  2/2006
KR  2007-0058046 A  6/2007

OTHER PUBLICATIONS

Pandit et al., NetProbe: A Fast and Scalable System for Fraud Detection in Online Auction Networks,2007, WWW '07: Proceedings of teh 16th international conference on World Wide Web, pp. 201-210.*
(Continued)

*Primary Examiner* — John Van Bramer
(74) *Attorney, Agent, or Firm* — Miles & Stockbridge P.C.; Mark A. Catan

(57) ABSTRACT

Entities may be matched to enhance the efficiency of various commercial activities using various system and method embodiments of the disclosed subject matter. Belief propagation on a graph data structure defining a bipartite or unipartite matching opportunity is used to calculate a best matching. In embodiments, functions are implemented based upon the match, such as executing sales between matched buyers and sellers in an online auction system. In embodiments, messages with scalar values carry information about the relative value of possible matchings, initially provided as weights or values for the possible matchings. Weights may depend on, for example, bids or costs. Messages may be passed, for example over a network between processors respective to the nodes. Belief values reflecting a best matching can be continuously updated for each node responsively to the value information and received messages to rank the matches respective to each node, which progressively improve. This allows short or complete terminations conditions to determine the goodness of the matching. Differing numbers of matches respective to each member of the disjoint sets and distributions of the desirability of different numbers of matches can be integrated in the matchings in respective embodiments.

25 Claims, 18 Drawing Sheets

(51) Int. Cl.
G06Q 30/02 (2012.01)
G06Q 30/08 (2012.01)
G06F 17/30 (2006.01)

(56) References Cited

U.S. PATENT DOCUMENTS

| | | | |
|---|---|---|---|
| 6,091,424 | A | 7/2000 | Madden et al. |
| 6,714,975 | B1 | 3/2004 | Aggarwal et al. |
| 6,952,682 | B1 | 10/2005 | Wellman |
| 7,489,638 | B2 | 2/2009 | Keslassy et al. |
| 7,733,895 | B2 | 6/2010 | Kesselman et al. |
| 7,778,247 | B2 | 8/2010 | Green |
| 7,788,260 | B2 | 8/2010 | Lunt et al. |
| 7,933,915 | B2 | 4/2011 | Singh et al. |
| 8,000,262 | B2 | 8/2011 | Leighton et al. |
| 8,078,255 | B2 | 12/2011 | Bhandarkar et al. |
| 8,150,634 | B1 | 4/2012 | Constantine et al. |
| 8,195,693 | B2 | 6/2012 | Syeda-Mahmood |
| 8,250,600 | B2 | 8/2012 | Kodialam et al. |
| 2001/0056395 | A1 | 12/2001 | Khan et al. |
| 2002/0099519 | A1 | 7/2002 | Srivastava |
| 2003/0140143 | A1 | 7/2003 | Wolf et al. |
| 2003/0185229 | A1 | 10/2003 | Shachar et al. |
| 2004/0267686 | A1 | 12/2004 | Chayes et al. |
| 2005/0048456 | A1 | 3/2005 | Chefd'hotel et al. |
| 2005/0226214 | A1 | 10/2005 | Keslassy et al. |
| 2005/0243736 | A1 | 11/2005 | Faloutsos et al. |
| 2005/0265618 | A1 | 12/2005 | Jebara |
| 2006/0115267 | A1 | 6/2006 | Kesselman et al. |
| 2006/0253418 | A1 | 11/2006 | Charnock et al. |
| 2006/0253476 | A1 | 11/2006 | Roth et al. |
| 2006/0271438 | A1 | 11/2006 | Shotland et al. |
| 2007/0014247 | A1 | 1/2007 | Ou et al. |
| 2007/0031003 | A1 | 2/2007 | Cremers |
| 2007/0050282 | A1 | 3/2007 | Chen et al. |
| 2007/0118432 | A1* | 5/2007 | Vazirani et al. ............ 705/26 |
| 2007/0156617 | A1 | 7/2007 | Szummer et al. |
| 2007/0185871 | A1 | 8/2007 | Canright et al. |
| 2007/0239694 | A1 | 10/2007 | Singh et al. |
| 2008/0027969 | A1 | 1/2008 | Wen et al. |
| 2008/0052152 | A1 | 2/2008 | Yufik |
| 2008/0071764 | A1 | 3/2008 | Omi et al. |
| 2008/0215607 | A1 | 9/2008 | Kaushansky et al. |
| 2008/0243735 | A1 | 10/2008 | Rish et al. |
| 2008/0256034 | A1 | 10/2008 | Chang et al. |
| 2008/0260230 | A1 | 10/2008 | Gotardo et al. |
| 2008/0275861 | A1 | 11/2008 | Baluja et al. |
| 2008/0275899 | A1 | 11/2008 | Baluja et al. |
| 2008/0307097 | A1 | 12/2008 | Sabatelli et al. |
| 2009/0022403 | A1 | 1/2009 | Takamori et al. |
| 2009/0110089 | A1 | 4/2009 | Green |
| 2009/0262664 | A1 | 10/2009 | Leighton et al. |
| 2010/0251290 | A1 | 9/2010 | Kodialam et al. |
| 2010/0257054 | A1 | 10/2010 | Martin et al. |
| 2011/0040619 | A1 | 2/2011 | Jebara et al. |
| 2012/0066172 | A1 | 3/2012 | Jebara |

OTHER PUBLICATIONS

Huang et al., Loopy belief propagation for bipartite maximum weight b-matching, 2007, Proceedings of the Eleventh International Conference on Artificial Intelligence and Statistics, pp. 1-8.*
http://eventseer.net/e/2936, "Call for Papers—AISTATS 2007", pp. 2.*
http://eventseer.net/e/2936, Call for Papers—AISTATS 2007, pp. 2.*
Pandit et al., NetProbe: A fast and Scalable System for Fraud Detection in Online Auction Networks, 2007, WWW '07 Proceedings of the 16th international conference on World Wide Web, pp. 201-210.*
Huang et al., Loopy belief propogation for bipartite maximum weight b-matching, 2007, Proceedings of the Eleventh International Conference on Artificial Intelligence and Statistics, pp. 1-8.*
Bayati et al., Maximum weight matching via max-product belief propagation, *In Proc. of the IEEE International Symposium on Information Theory*, 2005.
Fremuth-Paeger et al., Balanced network flows, 1. a unifying framework for design and analysis of matching algorithms, *Networks*, 33(1):1-28, 1999.
Jaakkola et al., Maximum-margin matrix factorization, In *Advances in Neural Information Processing Systems 17*, MIT Press, Cambridge, MA, 2004.
Jebara et al., B-matching for spectral clustering, *In Proc. of the European Conference on Machine Learning, ECML*, 2006.
Marlin et al., Collaborative filtering and the missing at random assumption, *In Proceedings of UAI 2007*, 2007.
Marlin, B., Modeling user rating profiles for collaborative filtering. *In Advances in Neural Information Processing Systems 17*. MIT Press, 2004.
McDiarmid, Colin, On the method of bounded differences, *Surveys in Combinatorics*, p. 148188, 1989.
Morris et al., Denoising and untangling graphs using degree priors, *In Advances in Neural Information Processing Systems 16*, MIT Press, Cambridge, MA, 2003.
Ng et al., On spectral clustering: Analysis and an algorithm, *In Neural Information Processing Systems*, 2001.
Rennie et al., Fast maximum margin matrix factorization for collaborative prediction, in *ICML '05: Proceedings of the 22nd international conference on machine learning*, pp. 713-719, New York, NY, USA, 2005, ACM.
Sanghavi et al., Linear programming analysis of loopy belief propagation for weighted matching, *In Advances in Neural Information Processing Systems 20*, pp. 1273-1280, MIT Press, Cambridge, MA, 2008.
Srebro et al., Weighted low rank approximations, *In Proceedings of the 22nd international conference on machine learning*, 2003.
Huang et al., Maximum Likelihood Graph Structure Estimation with Degree Distributions, *In Analyzing Graphs: Theory and Applications, NIPS Workshop*, 2008 (6 pages).
Shi et al., Normalized Cuts and Image Segmentation, *In IEEE Transactions on Pattern Analysis and Machine Intelligence*, vol. 22, No. 8, Aug. 2000.
Huang et al., Loopy Belief Propagation for Bipartite Maximum Weight b-Matching, AISTATS 2007, Proceedings of the Eleventh International Conference on Artificial Intelligence and Statics, Mar. 21-24, 2007, Puerto Rico.
Jebara et al., Graph Construction and b-Matching for Semi-Supervised Learning, posted on Columbia university Website May 13, 2009.
Alon, Eigenvalues and expanders. Combinatorica, 6(2):83-96, 1986.
Alon et al., λ1, isoperimetric inequalities for graphs, and superconcentrators. Journal of Combinatorial Theory, Series B, 8:73-88, 1985.
Ambuhl, et al., Inapproximability results for sparsest cut, optimal linear arrangement and precendence constrained scheduling. In Foundations of Computer Science, 2007.
Arora, et al. Expander flows, geometric embeddings and graph partitioning. In Symposium on Theory of Computing, 2004.
Sanghavi et al., Linear programming analysis of loopy belief propagation for weighted matching. In Advances in Neural Information Processing Systems, 2005.
Spielman et al., Spectral partitioning works: Planar graphs and finite element meshes. In IEEE Symposium on Foundations of Computer Science, 1996.
Shaw et al., Structure preserving embedding. In Danyluk et al. (2009), p. 118. ISBN 978-1-60558-516-1.
Duan et al., Approximating maximum weight matching in near-linear time. In Proceedings 51$^{st}$ IEEE Symposium on Foundations of Computer Science (FOCS), 2010.
Huang et al., Exact graph structure estimation with degree priors. In M. Wani, M. Kantardzic, V. Palade, L. Kurgan, and Y. Qi, editors, ICMLA, pp. 111-118. IEEE Computer Society, 2009. ISBN 978-0-7695-3926-3.
Karatzoglou et al., Collaborative filtering on a budget. In Y. Teh and M. Titterington, Editors, Proceedings of the Thirteenth International Conference on Artificial Intelligence and Statistics (AISTATS), vol. 9, pp. 389-396, 2010.

(56) References Cited

OTHER PUBLICATIONS

Kolmogorov et al., Blossom v: a new implementation of a minimum cost perfect matching algorithm. Mathematical Programming Computation, 1:43-67, 2009. ISSN 1867-2949. URL http://dx.doi.org/10.1007/s12532-009-0002-8. 10.1007/s12532-009-0002-8.

Shaw et al., Minimum volume embedding. In M. Meila and X. Shen, editors, Proceedings of the 11th International Conference on Artificial Intelligence and Statistics, vol. 2 of JMLR: W&CP, Mar. 2007.

Weiss et al., MAP Estimation, Linear Programming and Belief Propagation with Convex Free Energies, School of Computer Science and Engineering, The Hebrew University of Jerusalem, Jerusalem, Israel, Proceedings of Uncertainty in Artificial Intelligence (UAI), 2007, Jul. 19-22, 2007.

Sankowski et al., Maximum weight bipartite matching in matrix multiplication time. Theor. Comput. Sci., 410(44): 4480-4488, 2009.

Tommi S. Jaakkola et al., "MAP Estimation Via Agreement on Trees: Message-Passing and Linear Programming" IEEE Transactions on Information Theory, vol. 51, No. 11, Nov. 2005, XP011141509, pp. 3697-3717.

Kyomin Jung et al., "Approximate message-passing inference algorithm", Information Theory Workshop, 2007, IEEE, Sep. 2-6, 2007, XP031136599, pp. 224-229.

Sujay Sanghavi et al., "Networking Sensors Using Belief Propagation", Communication, Control, and Computing, 2008 Forty-Sixth Annual Allerton Conference, IEEE, Sep. 23-26, 2008, XP031435179, pp. 384-391.

David A. Smith et al., "Dependency Parsing by Belief Propagation", Proceedings of the 2008 Conference on Empirical Methods in Natural Language Processing, Oct. 2008, XP055098477, pp. 145-156.

Extended European Search Report for corresponding EP Patent Application No. 10778422 dated Feb. 5, 2014.

Chinese Office Action with English translation for corresponding Chinese Patent Application No. 200980156712.X dated Jan. 13, 2014.

Bayati et al., "Belief-Propagation for Weighted b-Matchings on Arbitrary Graphs and its Relation to Linear Programs with Integer Solutions", Technical Report, ARXIR: 0709.1190, Microsoft Research, Sep. 2007, 22 pages.

Sujay Sanghavi et al., "Belief Propagation and LP relaxation for Weighted Matching in General Graphs", In Proceedings of NIPS, Dec. 2007, 17 pages.

International Search Report for PCT/US12/32318 mailed Jul. 17, 2012.

European Extended Search Report for EP 09832595.4 mailed Dec. 5, 2013.

EPO: Notice from the European Patent Office dated Oct. 1, 2007 concerning business methods, Offical Journal of the European Patent Office, vol. 30, No. 11, (Nov. 1, 2007), pp. 592-593, XP007905525.

Natalia Khuri, "Operon Prediction with Bayesian Classifiers", (2007). Master's Projects. Paper 128.

Natwar Modani et al., "A Framework for Session Based Recommendations", K. Bauknecht et al., (Eds.): EC-Web 2005, LNCS 3590, pp. 108-117, 2005.

Silva et al., "Ranking Relations Using Analogies in Biological and Information Networks", The Annals of Applied Statistics 2010, vol. 4, No. 2, pp. 615-644.

\* cited by examiner

BELIEF PROPAGATION FOR GENERALIZED MATCHING

This application claims the benefit of U.S. Provisional Application No. 61/023,767, entitled "Belief Propagation for Generalized Matching" filed on Jan. 25, 2008, U.S. Provisional Application No. 61/029,206, entitled "Belief Propagation for Generalized Matching" filed on Jan. 25, 2008, and U.S. Provisional Application No. 61/122,356, entitled "Clustering Using B-Matching and Semidefinite Embedding Algorithms" filed on Dec. 12, 2008, each of which is incorporated herein by reference in its entirety.

This invention was made with government support under Grant No. IIS-0347499 awarded by National Science Foundation. The government has certain rights in the invention.

Embodiments of the present invention relate generally to matching, and, more particularly, to methods, systems, one or more computers program products and one or more computer readable media for matching things such as goods, services, and people to other entities, such as buyers, businesses, and people. Often these kinds of matchings present the opportunity to optimize some global good, such as revenue for a seller. Such an optimized matching can be handled using various methods.

DETAILED DESCRIPTION

Figure 1A:
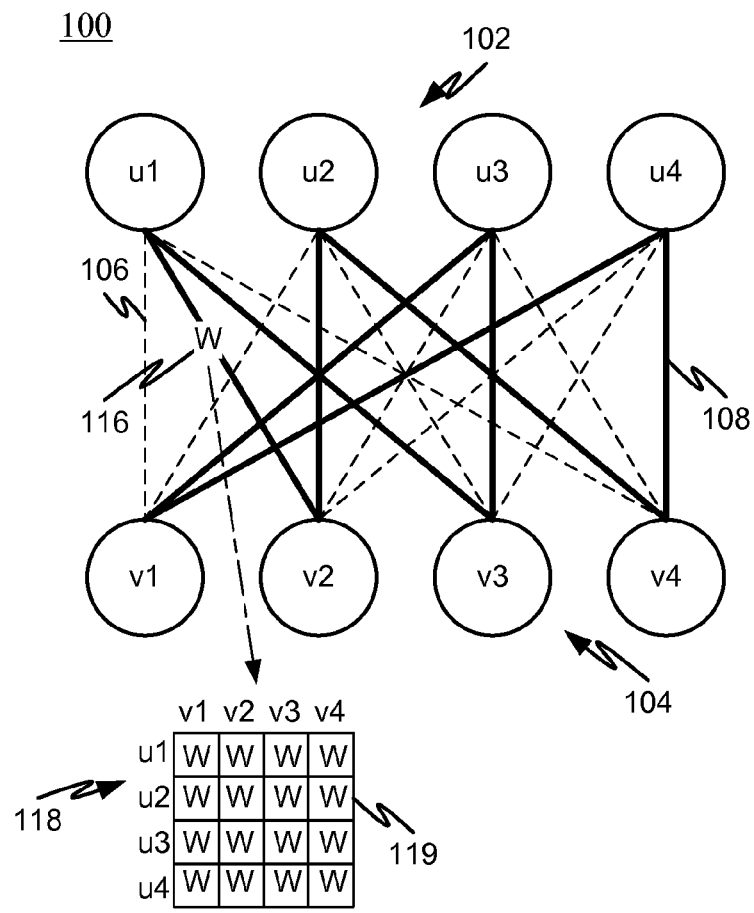
FIG. 1A is a schematic diagram of a matching problem represented as a bipartite graph showing matched and unmatched elements according to some embodiments of the disclosed subject matter.

FIG. 1A is a schematic diagram of a matching problem represented as a bipartite graph showing matched and unmatched elements according to some embodiments of the disclosed subject matter. The bipartite graph 100 shows a first group of nodes 102 (u1-u4) matched to a second group of nodes 104 (v1-v4). The first group may represent a first group of entities or things such as goods, people, or resources and the second group may represent a second group of entities or things such as consumers, people, or resource users. Kinds of things that can make up these first and second groups are numerous as should be clear from the instant disclosure, but a common theme in most embodiments is that entities of the first group are to be matched to entities of the second group as a part of some kind of a transaction and the precise matching may correspond to some kind of aggregate value such as maximum total revenue. The matching problem posed by the context of the particular first and second groups and the aggregate value sought may also involve constraints such as the number of first group of things that are to be matched to a given second group of thing. Groups could be distinguished by any classification, and groupings are not limited by the examples given.

In FIG. 1A, dashed lines (e.g., 106) represent possible edges and solid lines (e.g., 108) represent b-matched edges. By b-matched, it is meant that the problem illustrated results in a desired b matches between each of the first group of things to one or more second group of things. In the case shown on the bipartite graph 100, b=2 for each node of groups 102 and 104, so that each node 102 or 104 is connected to two other nodes 104 or 102 with matched edges 108.

Typically, the information representing the potential assignment as indicated by all of the lines 106 and 108 can be supplemented with additional information, generally, weights, which indicate something about the value or cost associated with making each assignment. Here a weight W value of an edge is represented at 116. This weight information may serve as a basis for selecting an assignment that provides some optimum or provides a basis for discriminating the goodness of one assignment scheme versus another. The additional information may be represented in the form of any suitable data structure to store a weight for each edge, such as a weight matrix 118 with each row corresponding to a member of the first group and each column corresponding to a member of the second group with each cell 120 at an intersections indicating the respective weight of an edge connecting each pair of members. The weight matrix 118 represents different weights for each combination of buyer and seller.

The problem of matching members of one group to another can be described in terms of a bipartite graph. Given a bipartite graph (which can be represented by 100) and associated weight data, a method can be used to perform a matching based on belief propagation. Here the example of a situation where it is desired to match suppliers with customers will be used to illustrate the method. One or more computers may be provided with information defining supplier and customers, which are referred to herein as "nodes," which information may be considered to define a bipartite graph 100. Each supplier node (u 102 or v 104) is connected to a customer node (v 104 or u 102) by an edge 108 so the one or more computers is supplied with the potential edges 108 of all the nodes 102, 104 mapping from a supplier node to a customer node. The one or more computers is also provided with access to weight data, for example a matrix 118 with a weight value 119 for each edge of the bipartite graph data structure. The process executed by the one or more computers is such that information is recorded and updated respective of each node, such that a subprocess is performed for each node that communicates with other nodes. In this example, the weight data may be total cost of goods and the optimum matching would coincide with maximum exchange of revenue between buyers and sellers.

Figure 1B:
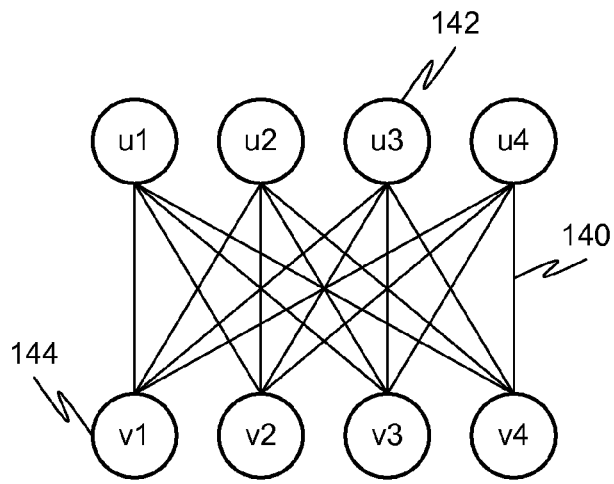
FIG. 1B illustrates networked processors according to some embodiments of the disclosed subject matter.

Referring now also to FIG. 1B, according to this and other embodiments, the matching problem may be distributed among multiple processors 142 and 144 communicating over a network such that each can send and receive messages, the links being depicted figuratively as connecting lines 140. For the present example, each node 102 or 104 may correspond to a respective node processor 142 or 144. An alternative would be that each processor would correspond to multiple nodes, but for the sake of discussion, the case where there is a separate processor for each node will be assumed. In such a case only a portion of the weight data in the weight matrix 118 may be provided to each supplier node processor 142, the portion being sufficient to indicate the weights of the edges that connect each supplier to all its potential customers (e.g., all the other customers). Similarly, only a portion of the weight matrix may be provided to each customer node processor 144 indicating the weights of the edges that connect the customer to all its potential suppliers. The node processors can access the respective weight information on common (e.g., central) or distributed data stores (e.g., respective of each node 142, 144 or community of node processors 142, 144).

Thus, each supplier or customer node may only require access to a vector, defining the potentially connected customer and supplier node weights. In an architecture embodiment for solving the bipartite graph problem, the graph and matrix data may be apportioned among different computers or processors such that each receives only the lists of its suppliers or customers and the associated weights. Other than that, the only other information required for a complete solution, as will become clear below, is a train of messages from other nodes, where each message may be a simple scalar.

A matching can be obtained that progressively seeks an optimization of the above problem by having each customer node keep a score of, for example, how much better buying from each supplier node is than buying from other suppliers. Also, each buyer node may keep a score of how much better selling to each customer node is than selling to other customers. Initially, the score may be just the dollar values represented by the weights. In the process described below, figuratively speaking, as the scores are updated, the supplier nodes tell the customer nodes how much potential money is lost if they are chosen according to their current scores and the customers tell the suppliers similarly. All the scores are continuously updated using this data which may be described as passing messages among the nodes, where the messages contain the information to keep score. Eventually, if the scores are updated according to subject matter described below, the scores progress toward an optimum sorted list of suppliers for each customer and a sorted list of customers for each supplier. Then each supplier or customer node's information can be used to select that supplier or customer's best one or more matches.

In the approach described, each node updates a value corresponding to each of the supplier nodes and customer nodes, with a processor. The process may be described as "belief propagation," and entails passing messages between adjacent nodes. An important aspect of the approach is knowing when to stop passing messages and determine the best matchings from the node's data. Because the approach can progress toward an optimal solution (that is, when the operation 210, or similar in the other embodiments, is performed, the best matches found get better and better with the number of messages processed). Thus, the one or more computers could be programmed to stop after a period of time or after a threshold number of messages. An optimal solution can be obtained upon the realization of another termination condition which is described below.

Once the termination condition is met, the one or more computers, a predetermined number of supplier nodes and a predetermined number of respective customer nodes matching each selected supplier node, may be selected and provided to a client process, for example the matchings may be displayed on a terminal for a user to see.

Note that the graph 100 includes a limited number of nodes and edges for illustration purposes. The number of nodes and edges in an actual graph data structure for the embodiments described below may include a greater or lesser number of nodes/edges than the number of nodes/edges shown in FIG. 1A. Also, the b value for each node in a particular implementation may be assigned a value other than 2 depending on the contemplated matching problem to be solved by the implementation.

Figure 2A:
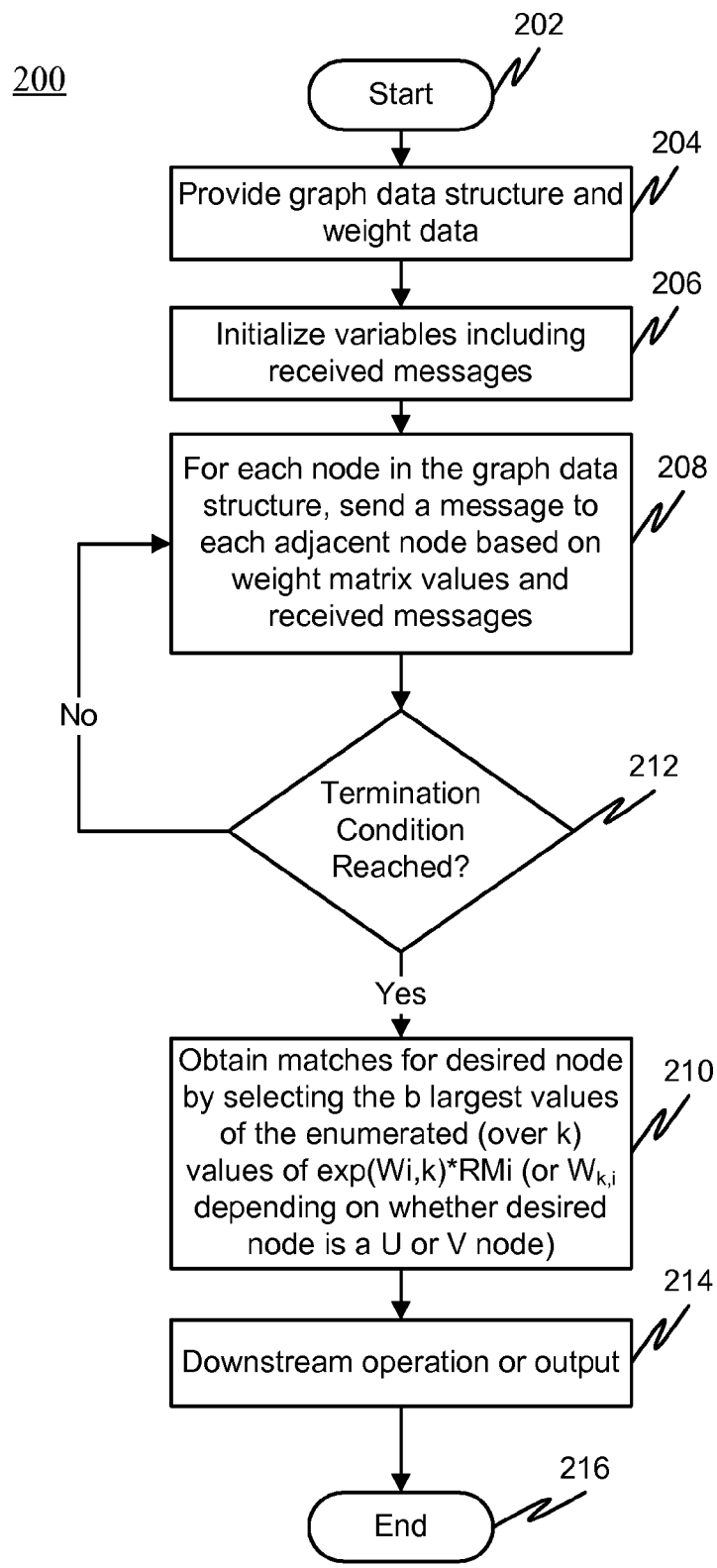
FIGS. 2A, 2B, and 2D are flow charts illustrating method processes for matching a set of things to a second set of things (or members of the same set of things in a unipartite application) based upon belief propagation according to some embodiments of the disclosed subject matter.
Figure 2B:
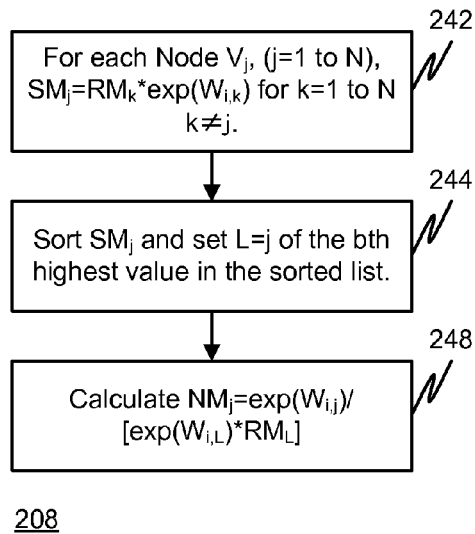
Figure 2C:
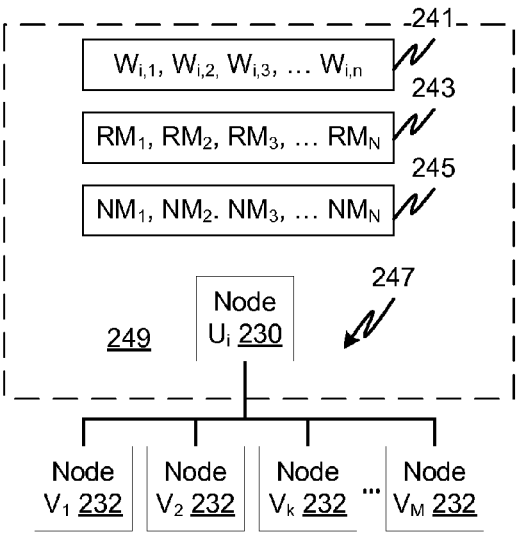
FIGS. 2C and 2E illustrate data storage and processing elements of a distributed processing embodiment, according to some embodiments of the disclosed subject matter.

Referring now to FIG. 2A through 2E, after providing the graph data structure and the edge weight data (e.g., weight matrix or vectors to all the node processors) as indicated by the operation 204 of flow chart 200, variables are initialized as indicated by the operation 206. The latter operation may include initializing values of data storage elements that store the values of the most recent messages received by the node processor. An iterative process is performed at 208 by each node processor 230, 250 (see node processors in FIGS. 2C and 2E) to generate messages and to process received messages until a termination condition 212 is met. Referring to FIGS. 2B and 2C, the multiple customer node processors 230 contain various updateable data stores 241, 243, 245 which hold a weight vector 241, a received message vector 243, and a new message vector 245. Each node processor 230 also may store data indicating the potential supplier nodes to which the node corresponding to the node processor 232 to may be potentially matched. This additional data may be inherent in the data stored at 241, 243, and 245 depending on the data structure employed since the weight matrices, received message values, and new message values are each respective of one of these attached node processors 232. Also, multiple supplier node processors 250 contain various updateable data stores 261, 263, 265 which hold a weight vector 261, a received message vector 263, and a new message vector 265. Each node processor 250 also may store data indicating the potential nodes to which the node corresponding to the node processor 252 to which it may be potentially optimally matched, but this data may be inherent in the other data as discussed above.

The node processor 230 receives messages from, and transmits messages to, node processors 232 to which it is connected, each of which corresponds to another node in the respective disjoint set. In this example, each node processor 230 and 232 corresponds to a node of a bipartite graph which has two disjoint sets U and V. The node processors 232 each have the features of node processor 230. The function of each node processor 230 may be to derive messages from the data in the data stores 241, 243, 245 and transmit such messages and to receive messages and update the data in the data stores 241, 243, 245. This is done iteratively, in the subprocess 208, as shown in process 200 of in FIG. 2A.

Figure 2D:
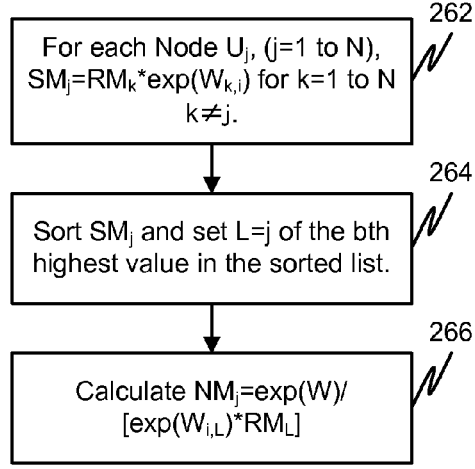
Figure 2E:
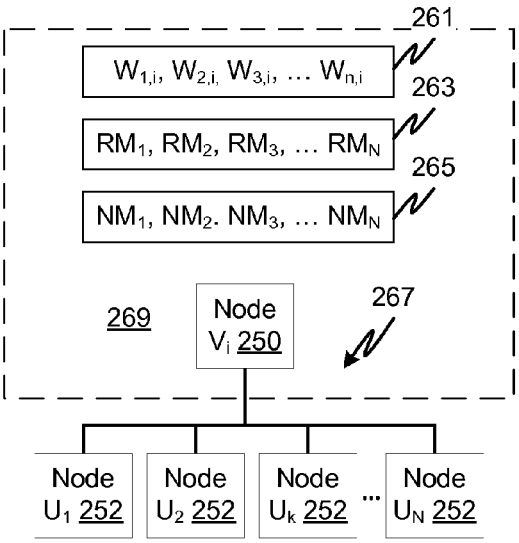

FIG. 2B illustrates an embodiment of operations within 208 of FIG. 2A and FIG. 2C illustrates further operations within 208 of FIG. 2A. Similar operations are illustrated in FIG. 2D. FIG. 2B shows operations a node in the first set U of the bipartite graph and FIG. 2D shows operations a node in the second set V of the bipartite graph. The operations are the same, but the operand indices are different in order to account for the set to which the node belongs.

However illustrated in FIG. 2A, the operations of FIG. 2B may be done by separate processors respective of one or more nodes in the single bipartite graph, by processors corresponding to subsets of nodes or by a single processor. Thus, the iteration illustrated as a single process at 208 may be performed by separate processors in an independent fashion based on messages shared between them.

Referring in particular to FIG. 2B, at 242, the node processor 230 performs calculations corresponding to node $U_i$. At 242, intermediate values $SM_j$ are calculated for each node $V_j$ to which node $U_i$ may be matched using messages received from the $V_j$ node processors. These intermediate values are simply $SM_j = RM_k * \exp(W_{i,k})$ for k=1 to N with k≠j. ("exp" denotes exponentiation based on the natural logarithm and * represents multiplication) That is, the contribution of the term for the message $RM_k$ where k=j is skipped over. At 244, the list of intermediate values $SM_j$ is sorted and the term corresponding to the supplier having the bth highest value is identified. The suppliers are indicated by the index j, so a value L is set to this index. At 248, new messages $NM_j$ are calculated to be sent to each supplier node processor 232 according to: $NM_j = \exp(W_{i,j})/[\exp(W_{i,L}) * RM_L]$. This process at 248 is referred to herein as a message update process to refer to the fact that the sequence of messages continuously updates the belief values calculated by other processors (not to imply that each processor in all implementations would continuously calculate and update its belief values, since this operation, for example as described at 210, can be done once or repeatedly).

Referring in particular to FIG. 2D, at 262, the node processor 250 performs calculations corresponding to node $V_j$. At 262, intermediate values $SM_j$ are calculated for each node $U_j$ to which node $V_i$ may be matched using messages received from the $U_j$ node processors. These intermediate values are simply $SM_j = RMk * \exp(W_{k,i})$ for k=1 to N with k≠j. ("exp" denotes exponentiation based on the natural logarithm and * represents multiplication) That is, the contribution of the term for the message $RM_k$ where k=j is skipped over. At 264, the list of intermediate values $SM_j$ is sorted and the term corresponding to the customer having the bth highest value is identified. The customers are indicated by the index j, so a value L is set to this index. At 266, new messages $NM_j$ are calculated to be sent to each customer node processor 252 according to: $NM_j = \exp(W_{j,i})/[\exp(W_{i,L}) * RM_L]$.

Referring back to FIG. 2A, the new messages are passed between all the node processors 232 and 252 until a termination condition 212 is reached. Operation proceeds based on whether the termination condition has been reached, as indicated at 212. The termination condition may be, for example, expiration of a watchdog timer or a number of messages received by each of the processors. Another alternative, and one that provides an optimum solution, is for each node processor to terminate when the messages stop changing. That is, the more recent message is compared to the previous message and if they are the same, the processor stops processing for sending node, or when all messages are the same as corresponding prior messages processing for all nodes can be halted. The operation 212 may also include updating the data stores 243 or 263.

As mentioned, the termination condition can be defined as reaching a steady state with respect to message updating, that is, the changes in messages stops. Alternatively, the steady state can be defined as no further message updates being sent if the sending processor makes the determination that the updates are not changing, or when a number of update message being sent or received is below a certain threshold. Alternatively, the termination condition can be defined in terms of a number of iterations of message updating or a number of messages sent (either an aggregate number or a number per node). In another alternative, the termination condition can be defined as the elapsing of a predetermined period of time. If the termination condition has been reached, processing continues with the selection, for an input node, of a predetermined number of supplier nodes or a predetermined number of customer nodes, as indicated at 214. Otherwise processing returns to the operation indicated at 208 and discussed above.

At 210, each node can calculate a vector showing the optimal matches. This can be done by U nodes by enumerating the values of $\exp(W_{i,k}) * RM_i$ over k and selecting the b largest values. This can be done by V nodes by enumerating the values of $\exp(W_{k,i}) * RM_i$ over k and selecting the b largest values. Note that the RM values are respective of the U of V node for which the calculation is done.

The Appendix I gives an explanation of the operations 208 and 210 and some further detail and analysis.

Note that the graph data structure can be any type of data structure suitable for use with generalized matching using belief propagation, such as a bipartite graph data structure. The graph data structure can contain one or more nodes of the same group (unipartite case) or different groups (bipartite case). For example, the graph data structure can include supplier nodes and customer nodes, where each supplier node can be connected to one or more customer nodes, and vice versa. In respective embodiments, the graph node data structure elements correspond to physical entities such as suppliers, customers, goods and/or services. In addition, in embodiments, the nodes correspond to other entities as described below with respect to other embodiments.

The weight data, such as represented by the weight matrix discussed above may represent a profit value for each edge between two nodes of the graph data structure. The weight matrix may also be a cost matrix representing a cost associated with a respective matching with suitable values for the terms to suit the computational methods. In the case of a profit matrix, the matching process typically includes a function to enhance and/or maximize profit. And in the case of a cost matrix, the matching process typically includes a function to reduce and/or minimize cost. The values in the profit matrix can be negative, zero, positive or a combination of these values.

An exemplary weight matrix may be represented by a data structure having a record corresponding to each node. The record for each node can include a list of adjacent nodes and a profit value for each of the adjacent nodes. The term "adjacent" refers to the nodes to which a given node may be connected in the same (unipartite case) or a disjoint set (bipartite case). The items of data in the profit matrix can represent physical entities or values such as actual supplier capacity, actual customer demand, monetary amounts of bidding or asking prices, monetary amounts of profit, distances, monetary costs, and/or the like. A portion of the profit matrix can be selected and provided to a respective node processor. The selected portion can represent only the profit matrix record corresponding to each respective node processor. By providing only a portion of the profit matrix to each node processor, data storage and transfer requirements can be reduced.

In operation 208, electronic messages are passed between adjacent nodes, which may be networked or communicate by a bus or any other data communication system. The node processor can be a computer, a single processor on a device with multiple processors, or any suitable machine capable of making the described computations and sending and receiving the described data. As described above, value (or data content) of each message is determined according to a compressed message update process. Received messages may be stored by the processor in an electronic memory, such as, for example, random access memory (RAM), non-volatile storage, a database or any suitable data store. The operation 210 can be performed the respective node processors. Downstream processing 214 may include a process that corresponds to the particular application. For example, if the bipartite graph may describe an application in which search queries or other key words terms appearing on web pages are assigned to bidders, as described in U.S. patent application Ser. No. 11/285,126 (published as U.S. Publication No. 2007/0118432) to Vazirani et. al., filed Nov. 21, 2005, which is hereby incorporated by reference in its entirety. In that case, a first set of nodes would be the bidders and a second set of nodes would be the sellers and the downstream operation would include placing the advertisements corresponding to the bidders to corresponding locations on one or more web pages, for example, alongside search results or on other web pages.

The general opportunity of matching bidders to advertising opportunities on the web can include placing advertisements in a location (such as a web page, a real time data stream such as a movie, a broadcast, a netcast, a feature such as a billboard or product placement in a data stream or other medium such as an online game world, or any other type of media outlet or scheme) and time (the instant advertising opportunity, for example defined by time and location, referable to as "advertising spots"). The bidders for advertising spots can be individuals, corporations, or virtual entities such as entities in games, such as avatars.

In the above and further embodiments in which multiple processors are used to perform belief propagation, respective processors can be linked by any suitable mechanism which may include local or distributed input/output systems including electronic or optical input/output systems and systems providing communication over networks, busses, crossbar switches, or any other suitable data interchange system.

An important example of advertising spots is auction systems for placing advertisements in response to events such as the submission of certain keywords or phrases in search engines or the contents of web pages accessed in a search. The advertisements can be placed alongside search results and on target web pages responsively to the content of the target or the terms used in a search query. In auction systems, users can enter bids for terms. In addition, the users can provide budgets or quotas to limit the number of advertisements that are placed, thereby allowing the user to maintain an advertising budget.

The auction provider, for example, an Internet search engine provider, can receive all or a part of the bid for the advertising spot. Also, additional factors, such as click-through rates, may also be taken into account in determining the bidding schedule.

The nodes selected at 214 (and corresponding operations in other embodiments) may be matched based on updated belief values. For example, in a b-matching problem, the b nodes having the highest belief values with respect to an input node are selected. Ties can be handled in a number of ways including by using a "coin toss" to select between tying nodes, or, alternatively or in addition, a small random value can be added to the weight or profit matrix value for each edge so that no two nodes are likely to tie. The selected nodes can be provided as output to another process or system. Processing can terminate at 216.

The 202-216 procedure may be repeated in whole or in part in order to accomplish a variety of transactions involving matching based on associated values of respective matches and data limiting or variably valuing the number of matches. In the simplest case, the data limiting the number of matches is a single constant value (b) for all the entities to be matched. In more general cases, where methods and systems for addressing them are discussed below, the number of desired matches can be respective of each node, that is, there may be quotas for up to 2n different matches, each respective of a different party. For example, each seller may identify a particular quota and each buyer may identify a particular quota. Also, the matches may be made according to the relative cost or profit or some other measure indicating the desirability associated with of a respective number of matches. This scenario is also discussed below.

Belief values may be updated for the entire graph data structure and then matching results may be provided for a plurality of nodes of interest before the belief values of the graph are updated. Alternatively, because the matching may result in changes to one or more nodes in the graph as a result of being selected as matching nodes (e.g., a supplier's amount of available goods may be reduced or a customer's requirement for goods may have been met), the belief values may need to be recomputed each time a matching is performed for a node.

Figure 3:
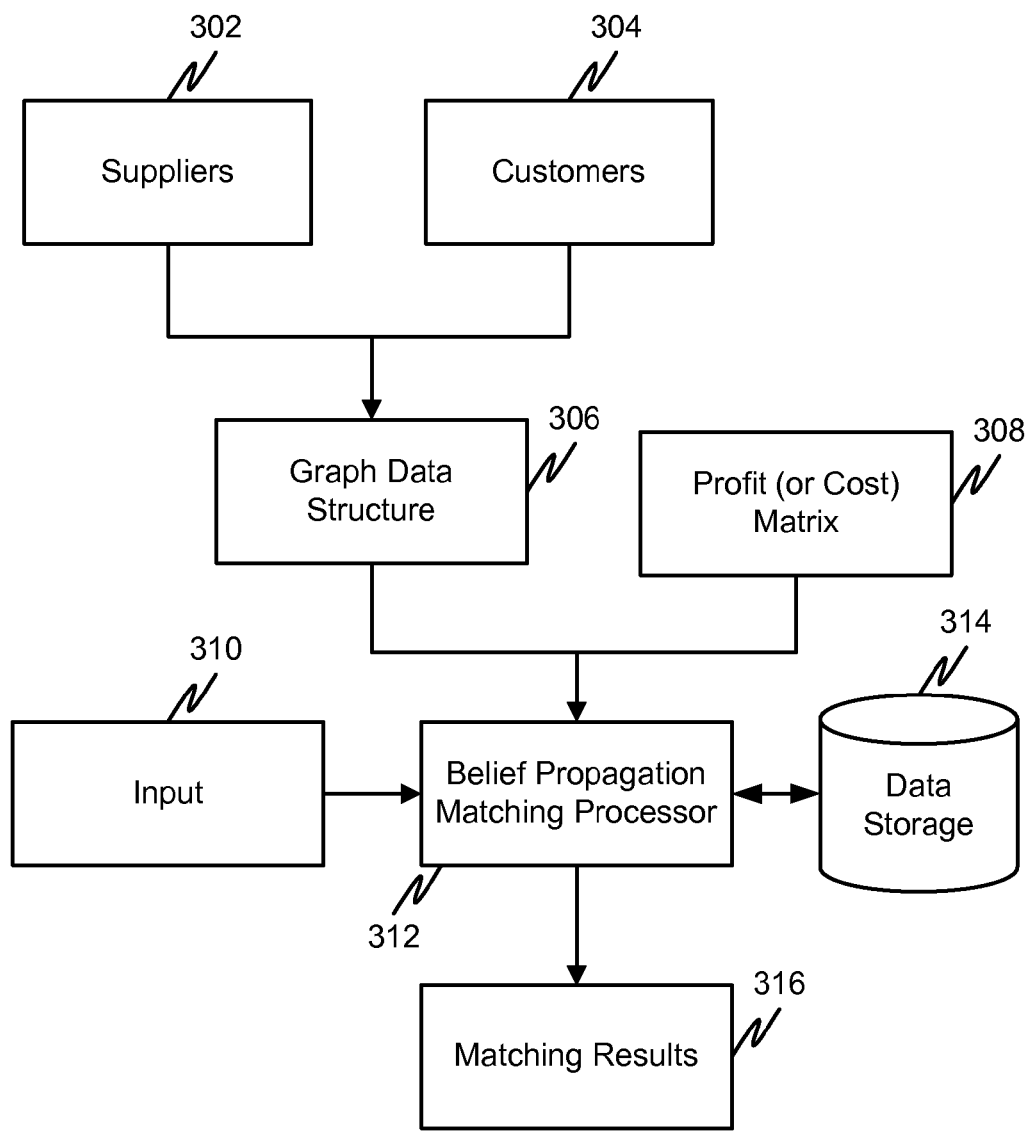
FIG. 3 is a diagram of a system for matching a first class of things to a second class of things using belief propagation according to some embodiments of the disclosed subject matter.

FIG. 3 is a block diagram of a system for generalized matching using belief propagation according to some embodiments of the disclosed subject matter. In particular, a belief propagation matching system 300 includes a group of suppliers 302 and a group of customers 304. Each of the suppliers 302 and customers 304 are represented as nodes in a graph data structure 306. The system 300 also includes a profit (or cost) matrix 308. The graph data structure 306 and profit matrix 308 are provided as input to a belief propagation matching processor 312. Also provided as input to the belief propagation matching processor 312 is input data 310. The belief propagation matching processor is coupled to a data storage 314 and provides matching results 316 as output.

In operation, the suppliers 302 and customers 304 are stored as nodes or vertices of the graph data structure 306. The profit matrix 308 stores the edge profits (or weights) for each edge connecting a supplier and customer. The graph data structure 306 and the profit matrix 308 can each be stored in the data storage 314.

The belief propagation matching processor 312 receives the input 310, which can be, for example, a node of interest for b-matching. The belief propagation matching processor 312 uses the graph data structure 306 and the profit matrix 308 to perform the b-matching according to the method described above with respect to FIG. 2A. The messages and beliefs are stored in the data storage 314. Once the termination condition is met, the belief propagation matching processor 312 outputs the matching results 316. The termination condition can include any of the termination conditions described above with reference to the conditional branch 212 in FIG. 2A.

The belief propagation matching processor 312 can operate according to software instructions retrieved from a one or more computers readable media. The software instructions, when executed by the belief propagation matching processor 312, cause the belief propagation matching processor 312 to perform the belief propagation generalized matching methods as described above.

For example, when adapted for an advertisement/keyword matching application, an implementation of software for the belief propagation matching processor 312 can function according to the following pseudo code:

```
Begin Pseudo Code
// define data structures and variables
data structure GraphNode { float received_msgs[ max_num_of_neighbors ] };
GraphNode ads [num_of_ads];
GraphNode keywords [num_of_keywords];
int Profit_Matrix [num_of_ads] [num_of_keywords];
int b=3;
Boolean Message_Changed = true;
initialize all received_msgs to 1; // to compute messages first time around
initialize Profit_Matrix with bid values;
// start a main loop to continue until no messages are changed
while ( Message_Changed == true ) {
        Message_Changed = false; // switch off loop unless a message changes
        // send messages from ads to keywords
        for i=1 to num_of_ads {
                for j=1 to num_of_keywords {
                        sorted_msgsp [ ] =
                                sorted list of ads[i].received_msgs[ ] *
                                        corresponding exp(Profit_Matrix[ ][ ]) values
                                        excluding that from keyword node j;
                        L = original index of sorted_msgs[b]; // get index (or
                                node) of the bth received msg*profit;
                        old_rcvd_msg = keywords[j].received_msgs[i];
                        keywords[j].received_msgs[i] =
                                exp(Profit_Matrix[i][j]) / (exp(Profit_Matrix[i][L]) *
                                ads[i].received_msgs[L]);
                        if old_rcvd_msg not equal to keywords[j].received_msgs[i]
                                then Message_Changed = true;
                } end j loop
        } end i loop
        // send messages from keywords to ads
        for j=1 to num_of_keywords {
                for i=1 to num_of_ads {
                        sorted_msgs[ ] = sorted list of keywords[j].received_msgs[ ] *
                                corresponding exp(Profit_Matrix[ ][ ]) values
                                excluding that from ad node i;
                        L = original index of sorted_msgs[b]; // get index (or
                                node) of the bth received msg*profit;
                        old_rcvd_msg = ads[i].received_msgs[j];
                        ads[i].received_msgs[j] =
                                exp(Profit_Matrix[i][j]) / (exp(Profit_Matrix[L][j]) *
                                keywords[j].received_msgs[L]);
                        if old_rcvd_msg not equal to ads[i].received_msgs[j]
                                then Message_Changed = true;
                } end i loop
        } end j loop
} end while loop - we are now done - no messages are changing
// now get the belief values for a keyword node of interest
for i=1 to num_of_ads {
        belief_values[i] = keywords[keyword_of_interest].received_msgs[i] *
        Profit_Matrix[i][keyword_of_interest];
} end i loop
sort belief_values[ ];
output largest b belief_values[ ];
End Pseudo Code
```

The above pseudo code represents an example of a linear implementation of the belief propagation method described above. Simplifications have been made for purposes of illustration including assuming that each node exchanges messages with all nodes of the corresponding type. Simplifications have been made in the flow charts of FIG. 2A and similar flow charts as well, which are for purposes of illustration and it is recognized that a commercial implementation of the basic methods can vary and can be made more efficient than disclosed in the flow charts and pseudo code. For example, in an actual implementation, nodes may only exchange messages with their respective neighbor nodes (the term "neighbor is used here to identify claims that can be connected), each being assigned to a respective processor. Also, the pseudo code example above continues until no messages are changed. As described above, there are other termination conditions that can be used with the belief propagation method. Another assumption made to simplify the illustration example is that the b value for all types of nodes is constant and the same for all. It will be appreciated that, in a contemplated implementation, nodes may have different b values and that the b values may be constant or variable.

The belief propagation matching processor 312 can be a general-purpose one or more computers adapted for generalized matching using belief propagation, a special-purpose one or more computers for generalized matching using belief propagation, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like.

The data storage 314 can be a database such as a relational database or any other suitable arrangement of data. The data can be stored in a physical media such as a volatile or nonvolatile electronic memory, a magnetic storage device, and/or an optical storage device.

Figure 4:
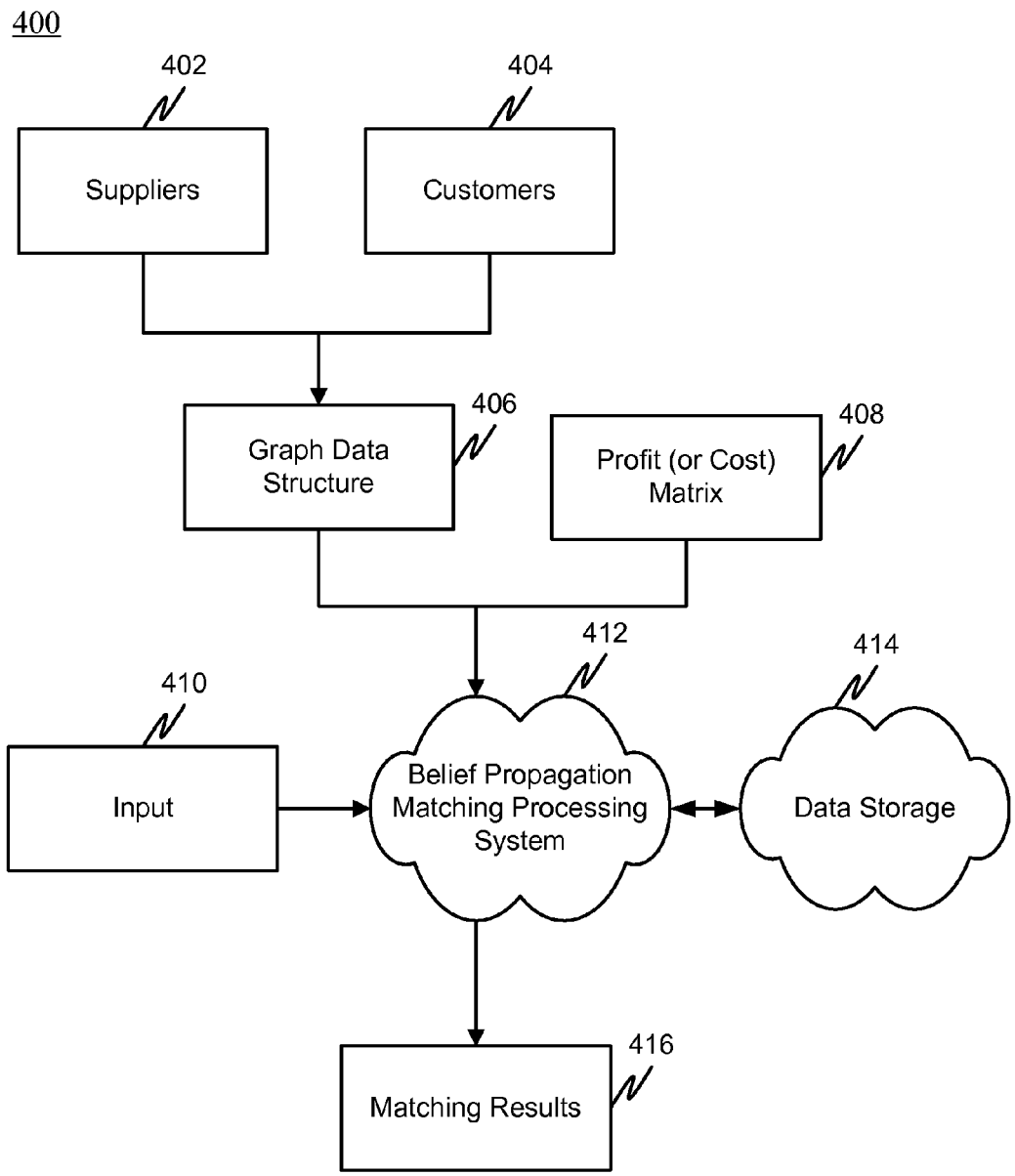
FIG. 4 is a diagram of a system for matching a first class of things to a second class of things using belief propagation including parallel processors according to some embodiments of the disclosed subject matter.

FIG. 4 is a block diagram of a system for generalized matching using belief propagation including parallel processors according to some embodiments of the disclosed subject matter. In particular, a belief propagation matching system 400 includes a group of suppliers 402 and a group of customers 404. Each of the suppliers 402 and customers 404 are represented as nodes arranged and stored in a graph data structure 406. The system 400 also includes a profit (or cost) matrix 408. The graph data structure 406 and profit matrix 408 are provided as input to a belief propagation matching system 412. Also provided as input to the belief propagation matching system 412 is input data 410. The belief propagation matching system 412 is coupled to a data storage 414 and provides matching results 416 as output.

In operation, the suppliers 402 and customers 404 are stored as nodes or vertices of the graph data structure 406. The profit matrix 408 stores the edge profits (or weights) for each edge connecting a supplier and customer. The graph data structure 406 and the profit matrix 408 can each be stored in the data storage 414.

The belief propagation matching system 412 receives the input 410, which can be, for example, a node of interest for b-matching. The belief propagation matching processor 412 uses the graph data structure 406 and the profit matrix 408 to perform a distributed form of belief propagation for b-matching described above with respect to FIG. 2A. The messages are updated using distributed (or parallel) processing and stored in the data storage 414. Once the termination condition is met, the belief propagation matching system 412 makes the matching results 416 available as output. The termination condition can include any of the termination conditions described above with reference to the conditional branch 212 of FIG. 2A.

The belief propagation matching system 412 can be a distributed or parallel processing system. For example, the belief propagation matching system 412 can be implemented as a grid or cloud computing system. The data storage 414 can be an Internet-based scalable storage infrastructure such as Amazon.com's Simple Storage Service (S3) or any other data storage system suitable for use with the belief propagation matching system 412.

The belief propagation matching system 412 can also be implemented according to any other suitable distributed or parallel processing architecture, including hardware and software systems containing more than one processing element or storage element, concurrent processes, multiple programs, and/or the like.

The systems and methods described above and below, herein, can be applied to matching nodes in a system represented by a unipartite graph data structure such as a social network. The systems and methods can be used to provide matching results such as social network referrals, connecting websites to other websites, routing messages on a network such as the Internet, and chip layout. In unipartite matching problems all nodes are of the same type or class (e.g., social network members) rather than disjoint sets and they can be matched with other nodes based on a value matrix having a weight or value for each edge of the unipartite graph data structure. For example, in the case of FIG. 1A, a unipartite version would have "u" nodes (102) that are the same as the "v" nodes (104).

Figure 5:
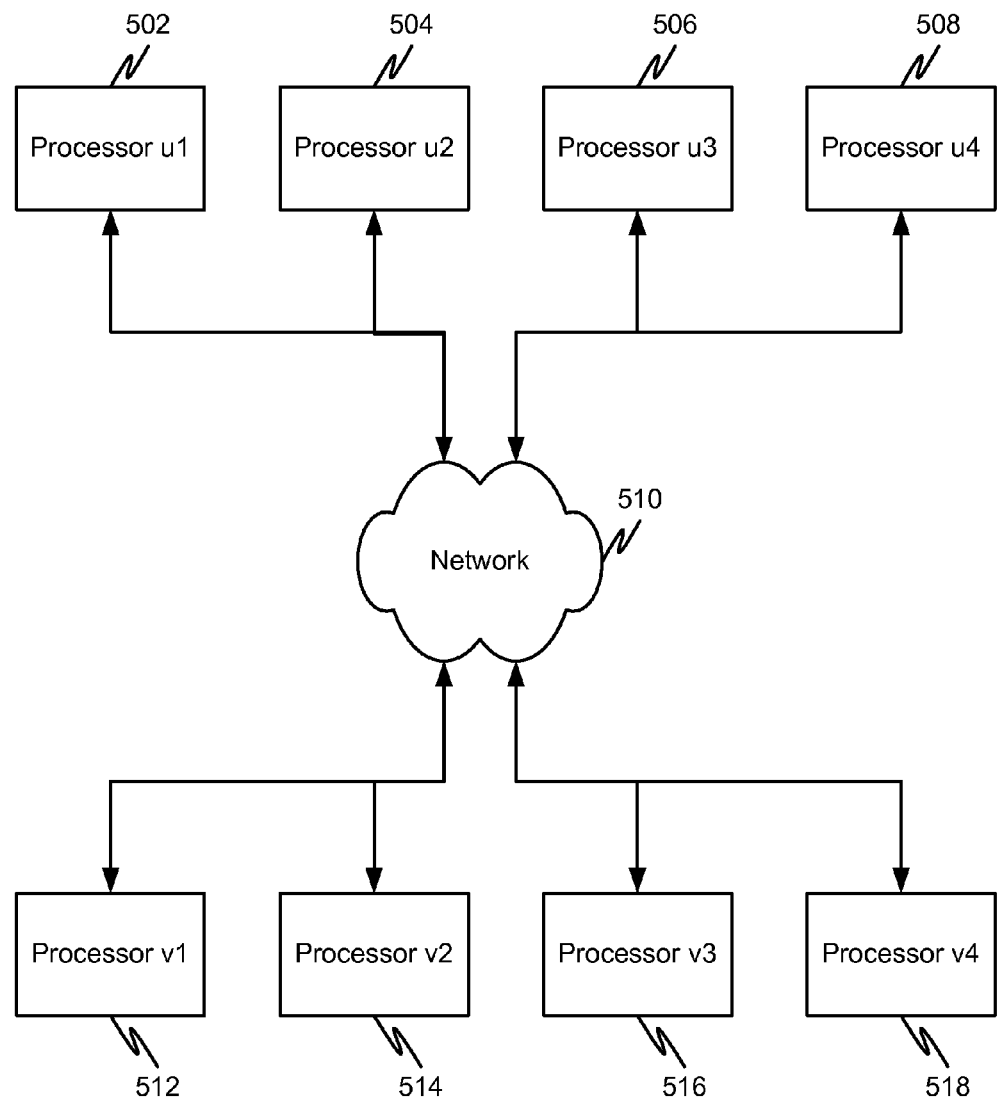
FIG. 5 is a diagram of an arrangement for distributed processing for performing generalized matching using belief propagation according to some embodiments of the disclosed subject matter.

FIG. 5 is a diagram of an arrangement of distributed processors for generalized matching using belief propagation according to some embodiments of the disclosed subject matter. Although only eight are shown, any number can be provided. In particular, in this example, a first group of node processors (502-508) correspond to nodes u1-u4 of the graph shown in FIG. 1A, respectively. A second group of node processors (512-518) correspond to nodes v1-v4 of the graph shown in FIG. 1A, respectively. Each of the node processors (502-508 and 512-518) are independently coupled to a network 510 (e.g., the Internet, a local area network, wide area network, wireless network, virtual private network, custom network, bus, backplane, or the like). By being interconnected through the network 510, each of the node processors (502-508 and 512-518) can communicate with the others and send/receive messages according to the belief propagation method described above. Also, each of the node processors (502-508 and 512-518) can be queried independently for its b-matched list generated by the belief propagation method described above. Not only can each node be independently queried, but each node can arrive at its optimal b-matched solution without requiring knowledge of the other nodes' solutions (i.e., the belief propagation method is "privacy protecting" with respect to each node).

The solutions for each node can be aggregated in a central data storage location or may be retained individually at each node, or grouped according to a criterion (e.g., grouping all supplier matches into a list and all customer matches into another list). This aspect is also discussed elsewhere in the present application and so will not be elaborated upon here.

The network 510 can be a network such as the Internet, a local area network (LAN), a wide area network (WAN), a virtual private network (VPN), a direct connection network (or point-to-point), or the like. In general, the network can include one or more now known or later developed technologies for communicating information that would be suitable for performing the functions described above. The selection of network components and technologies can depend on a contemplated embodiment.

In FIG. 5, one processor is shown for each node for clarity and simplicity of illustrating and describing features of an embodiment. It will be appreciated that each processor may perform the belief propagation method for more than one node.

Figure 6:
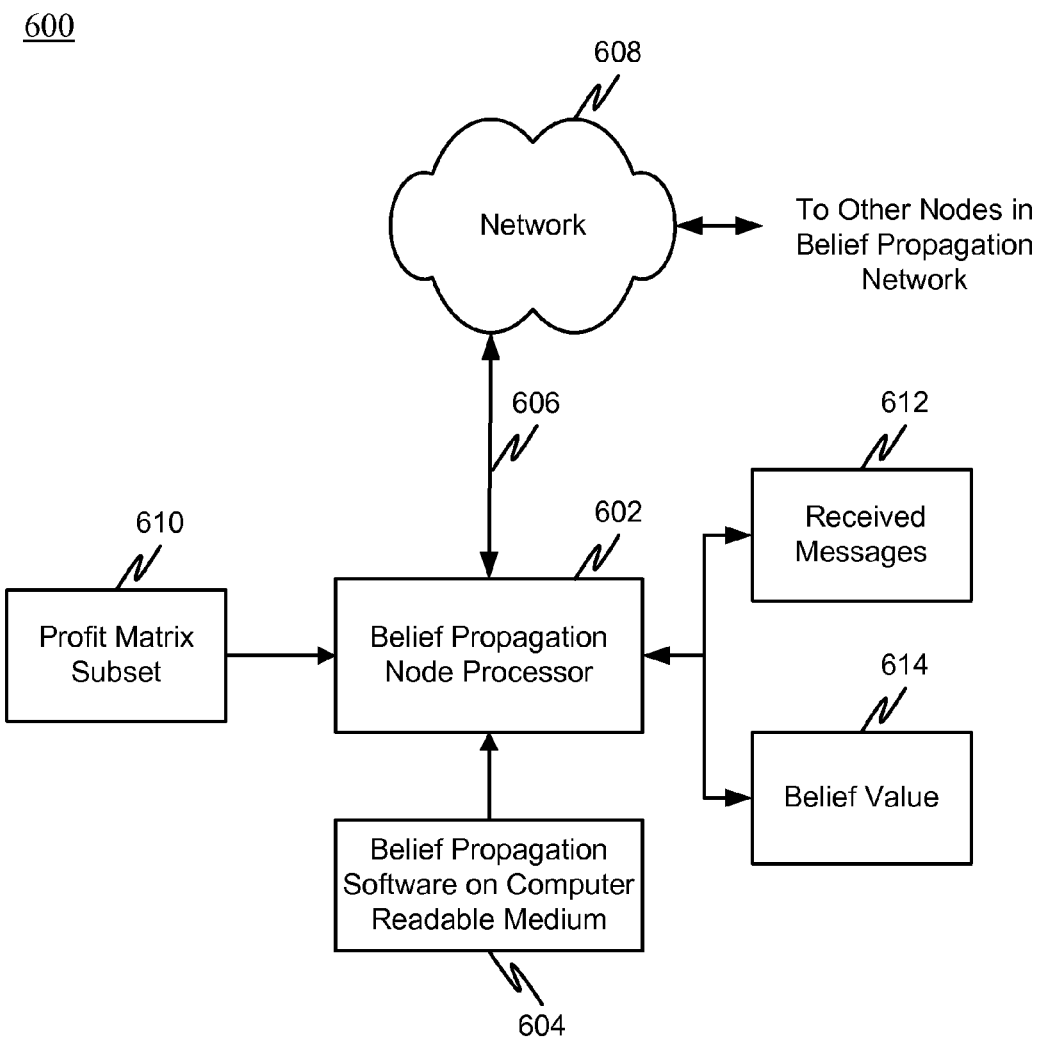
FIG. 6 is a diagram of a node processor according to some embodiments of the disclosed subject matter.

FIG. 6 is a diagram of a node processing system for generalized matching using belief propagation according to some embodiments of the disclosed subject matter. In particular, the node processing system 600 includes a belief propagation node processor 602 that is adapted to access belief propagation software on one or more computer-readable media 604. The belief propagation node processor 602 is coupled via link 606 to a network 608. The belief propagation node processor 602 is also coupled to an electronic data store that has stored therein a profit matrix subset 610, received messages 612 and belief values 614.

In operation, the belief propagation node processor 602 loads the belief propagation software 604 from the one or more computer readable media and executes the software. Once executing, the software directs the belief propagation node processor 602 to perform generalized matching using belief propagation according to the method described above. The belief propagation node processor 602 accesses the profit matrix subset 610 and computes an updated message value for each connected (or neighbor or adjacent) node and sends the respective updated message to each connected node. The belief propagation node processor 602 also receives updated messages from the connected nodes. The received messages are stored in the received messages area 612 of data storage. The received messages 612 are used in connection with the profit matrix subset 610 to update belief values 614 for each of the connected nodes. The profit matrix subset 610 is the portion of the profit matrix that includes data regarding nodes connected to the node represented by the belief propagation node processor 602.

Once a termination condition has been reached, the belief propagation node processor 602 can sort the belief values 614 and the b connected nodes with the largest belief values can be selected as the b-matching solution for the node corresponding to the belief propagation node processor 602. It will be appreciated that the selection of the largest belief values is applicable to an example in which a profit matrix is used and it is desirable to enhance and/or maximize profit and that other sorting and selection techniques may be used in a particular embodiment, for example in an embodiment employing a cost matrix it may be appropriate to select the smallest belief values.

The belief propagation software on a one or more computers readable media 604, when executed, can cause the belief propagation node processor 602 to operate according to the following pseudo code:

```
Begin Pseudo Code
// define data structures and variables
float Received_Msgs [num_of_neighbors];
graph node address Neighbor_Nodes [num_of_neighbors];
int Profit_Matrix [num_of_neighbors];
int b=3;
Boolean Message_Changed = true;
initialize all Received_Msgs to 1; // to compute messages first time around
initialize Profit_Matrix with bid values of neighbors;
// start a main loop to continue until no messages are changed
while ( Message_Changed == true ) {
  Message_Changed = false; // switch off loop unless a message changes
  Receive Messages from neighbors;
  Compare new Received Messages with corresponding stored Received Messages to look for changed messages;
  If Any Changed Messages Received {
    Store Received Messages in Received_Msgs[ ];
    Message_Changed = true;
    for j=1 to num_of_neighbors {
      Sorted_Msgs[ ] = sorted list of Received_Msgs[ ] *
                      corresponding Profit_Matrix[ ] values excluding
                      j;
      L = original index of Sorted_Msgs[b]; // get index (or
                      node) of the bth received msg*profit;
      Message =
                      exp(Profit_Matrix[j]) /
                      (exp(Profit_Matrix[L]) *
                      received_msgs[L]);
      Send Message to Neighbor_Node[j];
    } end j loop
  } end if changed message changed
} end while loop - we are now done - no messages are changing
// now get the belief values for this node
for j=1 to num_of_neighbors {
  belief_values[j] = received_msgs[j] *
                     Pofit_Matrix[j];
} end j loop
sort belief_values[ ];
output largest b belief_values[ ];
End Pseudo Code
```

The above pseudo code example makes several assumptions in order to simplify the pseudo code for illustration purposes. For example, the b value is a constant value. Also, the code is assumed to be used on a processor that is computing the belief propagation for a single node of the graph, so that the indexing can be simplified for illustration.

Generalized matching or auction problems find the best assignment of goods to consumers or advertisers to consumers when given a matrix of weights or value for each possible assignment. Generalized bipartite matching is 100% solvable by linear programming.

The disclosed subject matter approach may employ belief propagation which provide certain advantages and can provide solutions which are 100% optimal. For example, it can provide solutions that are optimal in an efficient manner and can scale up to problems involving millions of users and advertisers. Other applications include network reconstruction, image matching, resource allocation, online dating, sensor networks, and others.

Online content providers can use the disclosed subject matter to better match advertising after a user enters a search term. Typically, online content providers show the top advertisers that bid the highest amount for a particular search term. Typically, this is done by performing a generalized matching and then controlling the display of the advertisement accordingly.

Figure 7:
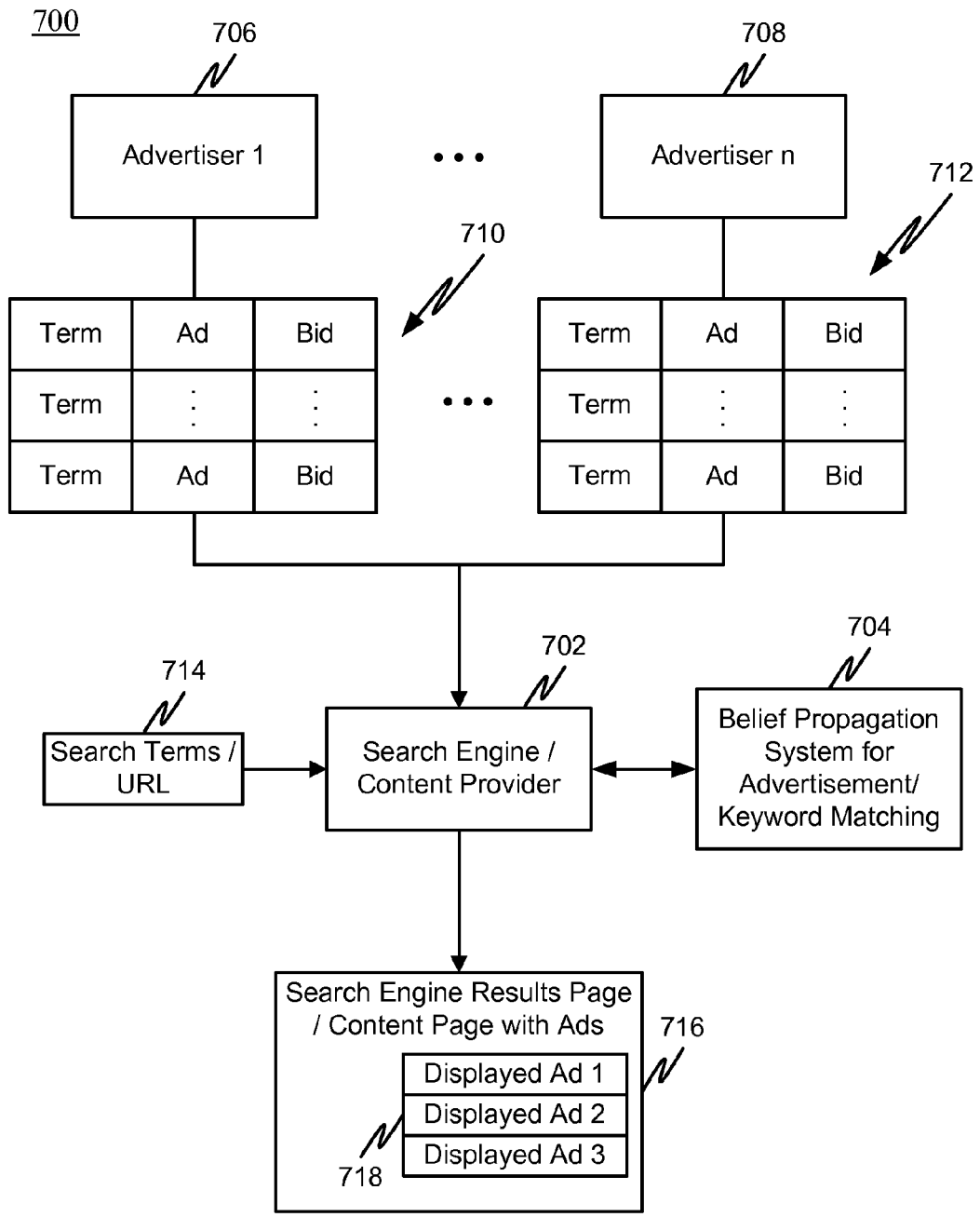
FIG. 7 is a diagram of a system for matching advertisers with search terms using belief propagation according to some embodiments of the disclosed subject matter.

FIG. 7 is a block diagram of a system for matching advertisers with search terms using belief propagation according to some embodiments of the disclosed subject matter. In particular, the system 700 includes a search engine/content provider 702 that is coupled to a belief propagation system for advertisement/keyword (search term) matching 704. The search engine/content provider 702 is also coupled to an electronic data store having stored therein data representing a plurality of advertisers (706-708) each having a respective set of search terms (or keywords), advertisement associated with each keyword, and a bid for placing each advertisement (710-712). The search engine/content provider 702 receives search terms, keywords and/or uniform resource locators (URLs) 714 from one or more users. In response to the received input 714, the search engine/content provider 702 performs search term/advertiser matching using the belief propagation system for advertisement/keyword (or search term) matching 704 to match a number of advertisements (three in this example) to the search term input, as described below with respect to FIG. 8. The b-matching advertisements (e.g., 3) are then displayed on a search engine results page (or content page of a partner website) 716 as displayed advertisements 718.

The b-matching advertisements may then be automatically placed and displayed on a search engine's results page. In other embodiments, other actions can be automatically implemented such as allocating computational resources to users, outputting authorization codes to allow users to access physical equipment (such as backhoes, automobiles, tools, or other mechanical equipment). The number and variety of consequential actions that can be automatically initiated or culminated as a result of the matchings made are varied and will depend on the applications.

In this example, the nodes of the graph data structure include the advertisers/advertisements and the keywords (or search terms). The profit matrix includes the bid prices for each ad by each advertiser. The bid prices may be used as raw values or may be manipulated in order to arrive at a profit for the bid. The b value represents the maximum number of advertisements to be displayed (e.g., 3). However, each advertiser/advertisement node may also be subject to other constraints on its belief value such as a quota of advertisements to be displayed during a given period of time or a quota on an amount of money to be spent during a given period of time. These constraints may affect whether or not an advertiser/advertisement is selected as matching for a keyword, even if the bid for that advertiser/advertisement is high enough that it would normally be selected.

Advertisers may seek to manipulate or "game" the advertising bid system. The belief propagation methods and systems described above can be modified to provide enhanced protection against bid or ad system manipulation. For example, one bid manipulation scheme includes attempting to deplete a competitor's ad budget by placing a bid just less than the winning bid, this causes the price actually paid by the winning bidder to be artificially high and thus depletes the competitor's budget faster than would normally occur. After the competitor's budget is depleted, their bid is no longer the highest and the ad can be placed at a lower cost by the manipulator. One technique for combating this type of manipulation is to augment the b-matching algorithm with a module that can select a winner other than the first place or b-highest matches. By selecting an ad to be placed other than the normal matching ads, the manipulator's ad can be chosen, thus depleting the manipulator's budget as well. This discourages advertisers from placing artificially high bids in an attempt to deplete a competitor's budget. It will be appreciated that other now known or later developed ad auction manipulation prevention measures can be used with the disclosed subject matter.

The system for matching advertisements with search terms or keywords 700 can comprise a second system (not shown) in addition to the belief propagation matching system for advertisement keyword matching (704). The second system can be a bid web server, which also would typically comprise one or more computer storage media, one or more processing systems and one or more databases. Conventional web browsers, running on client computers can be used to access information available through the bid web server and permit advertisers to place bids for desired keywords that will be queried through the search engine or content provider. The bid web server can be accessed through a firewall, not shown, which protects account information and other information from external tampering. Additional security measures such as Secure HTTP or the Secure Sockets Layer may be provided to enhance the security of standard communications protocols.

Figure 8:
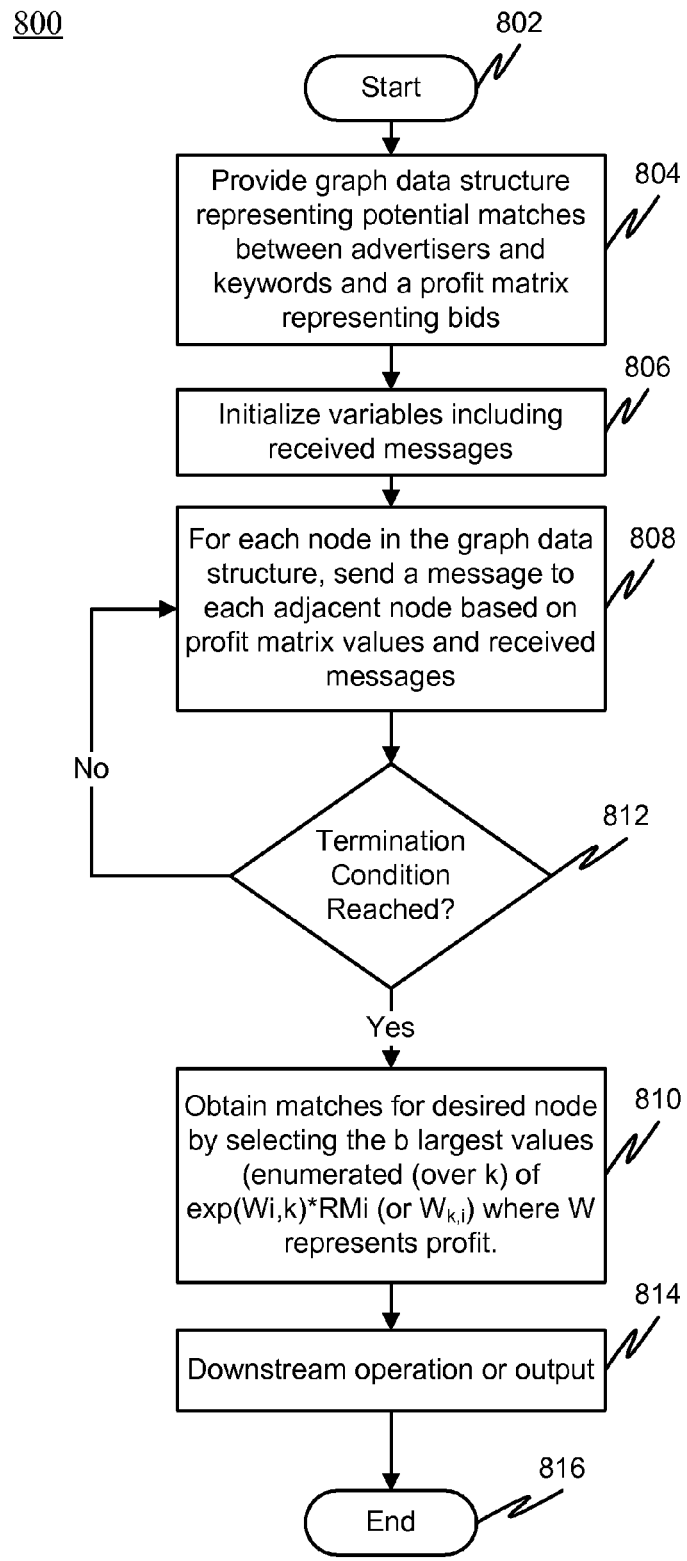
FIG. 8 is a chart of a method of matching advertisers with search terms using belief propagation according to some embodiments of the disclosed subject matter.

FIG. 8 is a chart of a method of matching advertisers with search terms using belief propagation according to some embodiments of the disclosed subject matter.

Processing begins at 802 with provision 804 of a graph data structure and other data. The graph data structure nodes or vertices represent advertisers and keywords to be matched. For example, the graph data structure can include advertiser nodes that represent an advertisement from a particular advertiser to be displayed when a users enters one of a group of keywords that are of interest to the advertiser. The graph data structure can include keywords or search terms that correspond to those entered by users and which need to have a set of advertisements matched with in order to enhance amd/or maximize revenue generated from pay-per-click advertising, for example. A profit matrix is also provided. The profit matrix represents a profit value for each advertiser/advertisement node connected to a corresponding search term node. At 806, variables are initialized. The latter operation may include initializing values of data storage elements that store the values of the most recent messages received by the node.

Next, electronic messages are passed between adjacent or neighboring nodes as indicated at 808. A belief propagation processor or distributed processing system adapted to perform belief propagation sends each message from a node based on the profit matrix values and received messages of that node. The value (or data content) of each message is determined according to a compressed message update process, described above. Received messages are stored by the processor in an electronic memory, such as, for example, RAM or a database. The message passing can be performed iteratively until a termination condition is met. A conditional branch based on the termination condition is indicated at 812. As discussed elsewhere, a variety of conditions can be defined.

Belief values for each neighboring node are updated based on received messages and stored as indicated at 810. The updating can be executed, for example, by the processor adapted to perform belief propagation. The belief value for each node is based on the received messages and the profit matrix portion. If the belief value updating would result in changes to messages already sent, then those messages are sent again with updated values. However, if no belief values change or no message updates are needed, then the node does not send out messages. The settling of the node's belief values for adjacent nodes can indicate that an optimal solution has been reached and the belief propagation has converged on a solution to the matching problem.

The b-matching advertiser/advertisement nodes matching an input search term are selected as indicated at 814. The selected advertiser/advertisement nodes are matched based on sorted belief values. For example, in a b-matching problem, the b nodes having the highest belief values (i.e., profit values) with respect to an input node are selected. The selected nodes can be provided as output to another process or system. For example, the advertisements corresponding to the selected nodes can be displayed on the search engine results page or content page associated with the search term. Then processing ends at 816.

As for the embodiment 200 (as well as analogous operations in other embodiments 1000, 1200, and 1444 described below), it will be appreciated that the sequence 802-816 may be repeated in whole or in part in order to accomplish contemplated generalized matching using belief propagation. For example, the belief values may be updated for the entire graph data structure and then matching results may be provided for a plurality of nodes of interest before the belief values of the graph are updated. Alternatively, because the matching may result in changes to one or more nodes in the graph as a result of being selected as matching nodes (e.g., an advertiser's quota of ads or quota of dollars spent may be reached), the belief values may need to be recomputed each time a matching is performed for a node.

Figure 9:
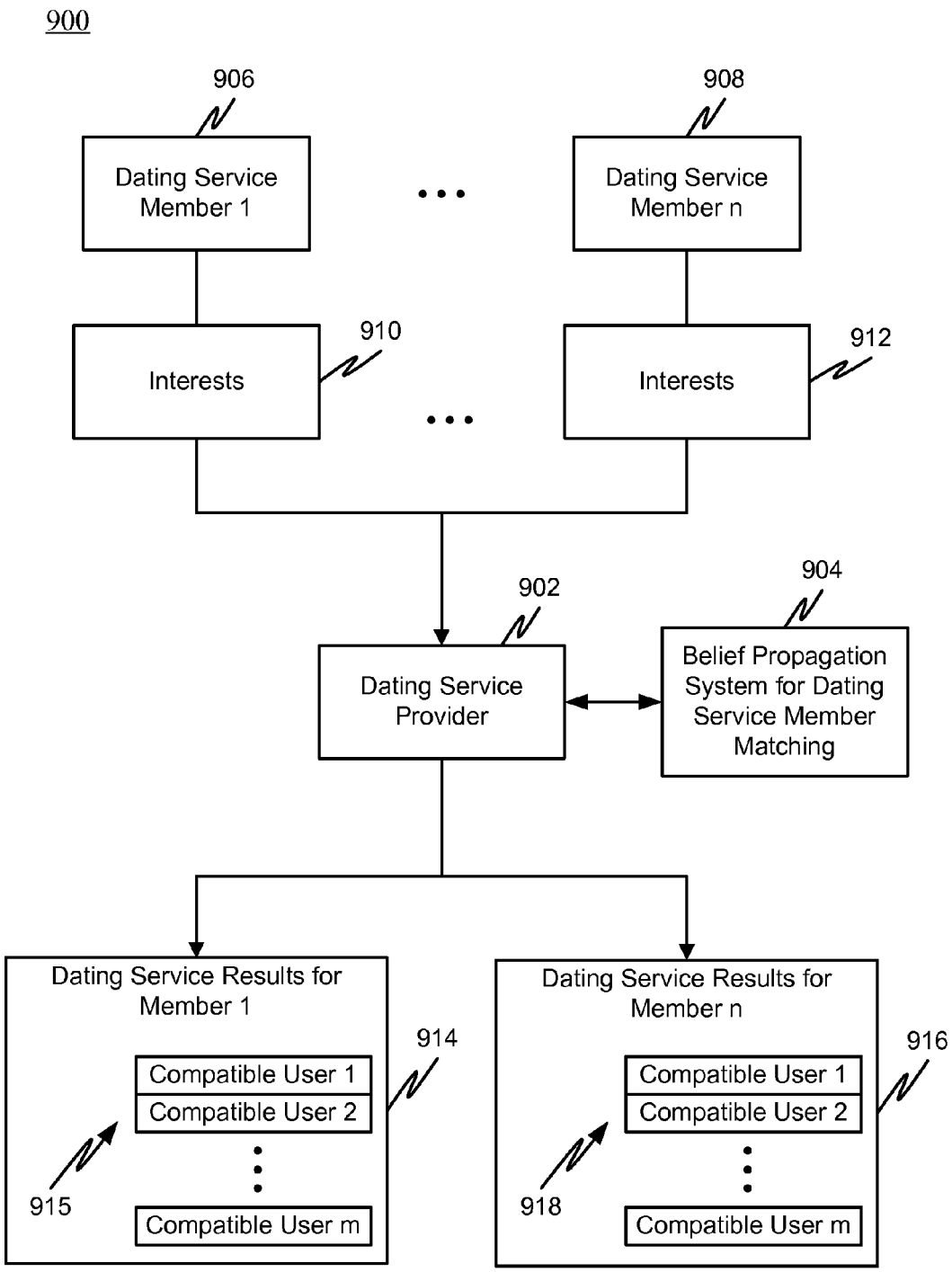
FIG. 9 is a diagram of a system for matching dating service members using belief propagation according to some embodiments of the disclosed subject matter.

FIG. 9 is a block diagram of a system for matching dating service members using belief propagation according to some embodiments of the disclosed subject matter. In particular, the system 900 includes a dating service provider 902 that is coupled to a belief propagation system for dating service member matching 904. The dating service provider 902 is also coupled to an electronic data store having stored therein data representing a plurality of dating service members (906-908) each having a respective set of interests (910-912). The dating service provider 902 receives the interests (910-912) from one or more respective users (906-908). The interests (910-912) can be used to generate a "profit" matrix (effectively captures a compatibility metric) for the users, for example, by generating a value representing the interests in common for a given pair of users. In response to the received interests (910-912), the dating service provider 902 performs member matching using the belief propagation system for dating service member matching 904 to match each member with b other members (e.g., for a fee a dating service may provide b introductions or matches to each user), as described below with respect to FIG. 10. The b matching members may then be communicated to the member that they are matched with as an introduction (e.g., each user may receive an email listing the members he or she has been matched with). For example, a results set 914 (e.g., in an email or displayed on the user's page at the dating service) can be provided for Member 1. Within the results are listed the b-matching members 915 selected to match Member 1. And, similarly, a results set 916 (e.g., in an email or displayed on the user's page at the dating service) can be provided for Member n. Within the results set 916 are listed the b-matching members 918 that have been selected to match Member n.

In this example, the nodes of the graph data structure include the members of the dating service. The "profit" matrix (or compatibility matrix) can include the predicted compatibility between a pair of members. The b value represents the number of matchings of most likely compatible members to be provided to each respective member (e.g., in accordance with the service agreement with the member). However, each member node may also be subject to other constraints on its belief value such as type of other member being sought, geographic preference, other preferences, a quota of matches to be provided during a given period of time, or the like. These constraints may affect whether or not a member is selected as matching for another member, even if the "profit" or compatibility for that member is high enough that it would normally be selected.

Figure 10:
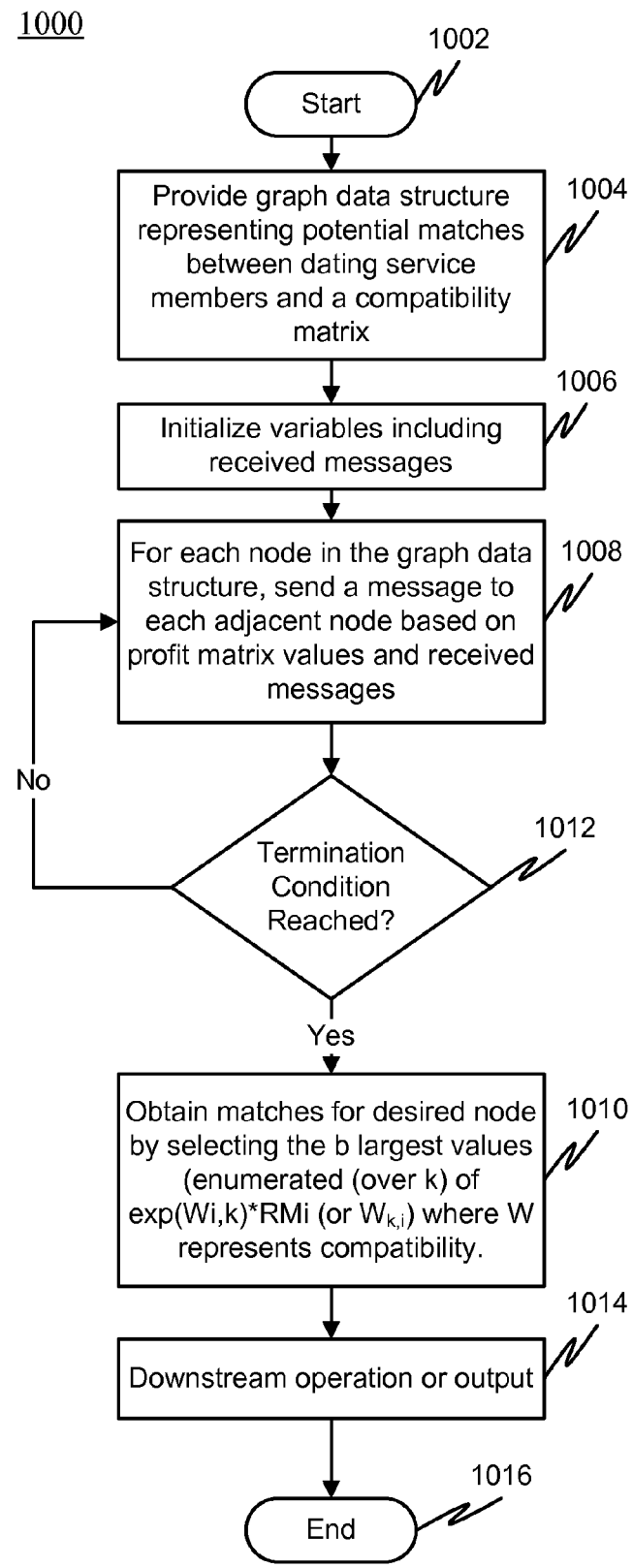
FIG. 10 is a chart of a method of matching dating service members using belief propagation according to some embodiments of the disclosed subject matter.

FIG. 10 is a chart of a method of matching dating service members using belief propagation according to some embodiments of the disclosed subject matter. Processing begins at 1002 and a graph data structure at 1004 is provided. The graph data structure nodes (or vertices) represent dating service members to be matched. A compatibility (or "profit") matrix is also provided. The compatibility matrix represents a compatibility (or "profit") value for each potential pairing of dating service members. As described above, the compatibility value can be determined based on interests in common, or may be determined according to other suitable methods conventionally used by dating service providers.

At 1006, variables are initialized. The latter operation may include initializing values of data storage elements that store the values of the most recent messages received by the node.

Next, electronic messages are passed between adjacent or neighboring nodes as indicated at 1008. The details are not repeated since they are similar to the operations detailed above and below. The message passing can be performed iteratively until a termination condition is met as indicated by the conditional branch 1012.

Belief values for each neighboring node may be calculated based on received messages and stored as indicated at 1010. In this and the other embodiments, the belief values can be calculated once after the termination condition (as shown in the flow chart) or continuously updated prior to the termination condition. The operations are described above and below and are therefore not detailed here again.

Figure 11:
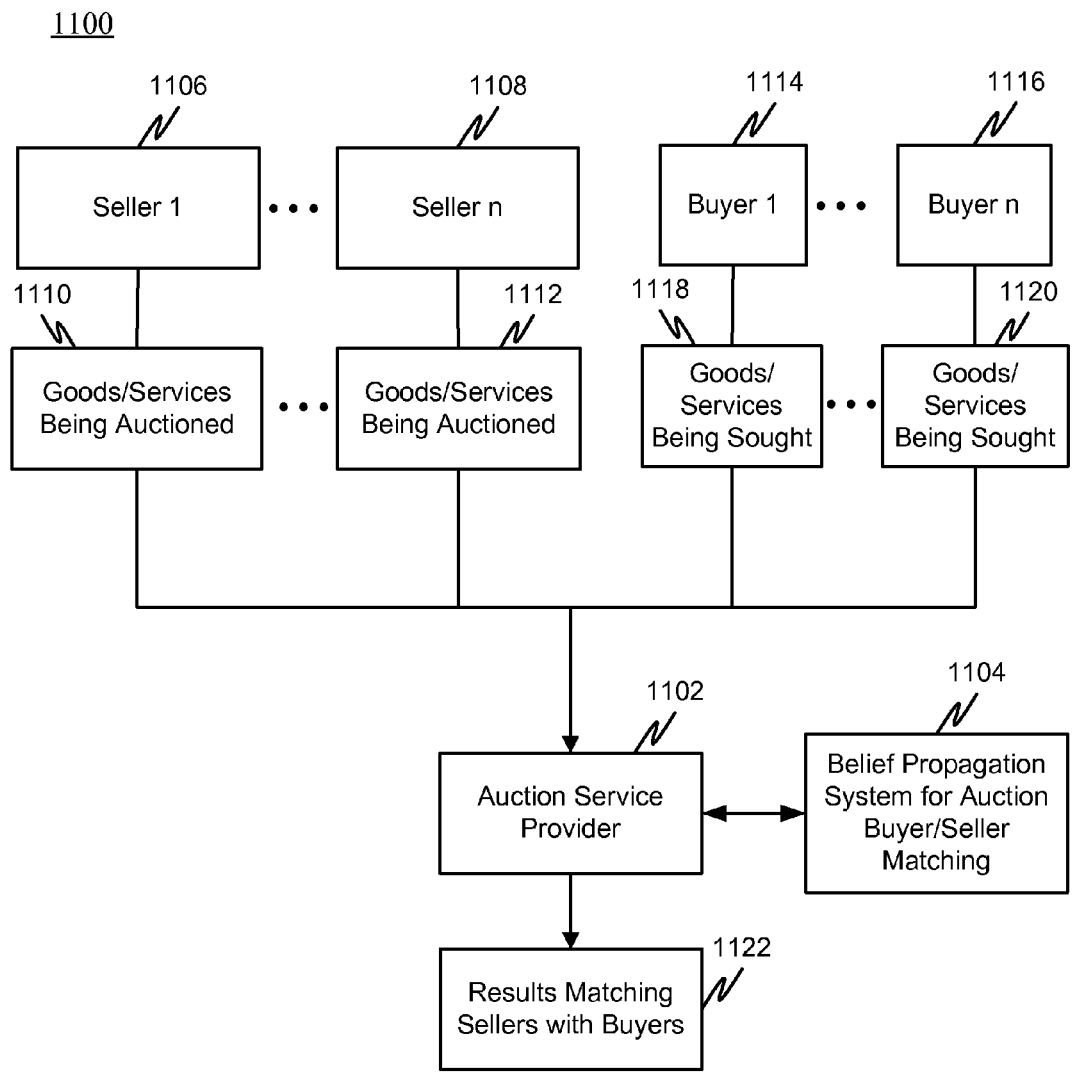
FIG. 11 is a diagram of a system for matching sellers and buyers or goods/services to bids in an auction using belief propagation according to some embodiments of the disclosed subject matter.

FIG. 11 is a diagram of a system for matching sellers and buyers in an auction using belief propagation according to some embodiments of the disclosed subject matter. In particular, the system 1100 includes an auction service provider 1102 that is coupled to a belief propagation system for auction buyer/seller member matching 1104. The auction service provider 1102 is also coupled to an electronic data store having stored therein data representing a plurality of sellers (1106-1108) each having a respective set of goods/services being offered (1110-1112), and a plurality of buyers (1114-1116) each having a respective set of goods/services being sought (1118-1120). The auction service provider 1102 receives the goods/services being offered (1110-1112) and the goods/services being sought (1118-1120), which can be used to generate a profit matrix for matching the buyers and sellers, for example, by generating a profit value for each seller selling his goods/services to a corresponding buyer seeking those goods/services.

In response to the received goods/services being offered (1110-1112) and the goods/services being sought (1118-1120), the auction service provider 1102 performs buyer/seller matching using the belief propagation system for auction buyer/seller matching 1104 to match each buyer with b sellers (e.g., such that the buyer's requirements are met), as described below with respect to FIG. 12. The b matching sellers may then be communicated to the buyer that they are matched with in order to complete a transaction. For example, a results set 1122 that has the b-matching between buyers and sellers can be provided as output. Alternatively, the matches for a particular buyer or seller can be communicated directly to that buyer or seller.

In this example, the nodes of the graph data structure represent goods/services being offered (1110-1112) and the goods/services being sought (1118-1120). The profit matrix can have values based on a particular buyer buying from a particular seller. For example, in the case of a buyer, the b value can represent the number of matching sellers needed to meet the buyer's requirements. In the case of a seller, the b value can represent the number of buyers needed to purchase the sellers goods/services being offered. However, each node may also be subject to other constraints on its belief value. These constraints may affect whether or not a buyer/seller is selected as matching for another buyer/seller, even if the profit for that matching is high enough that it would normally be selected.

Figure 12:
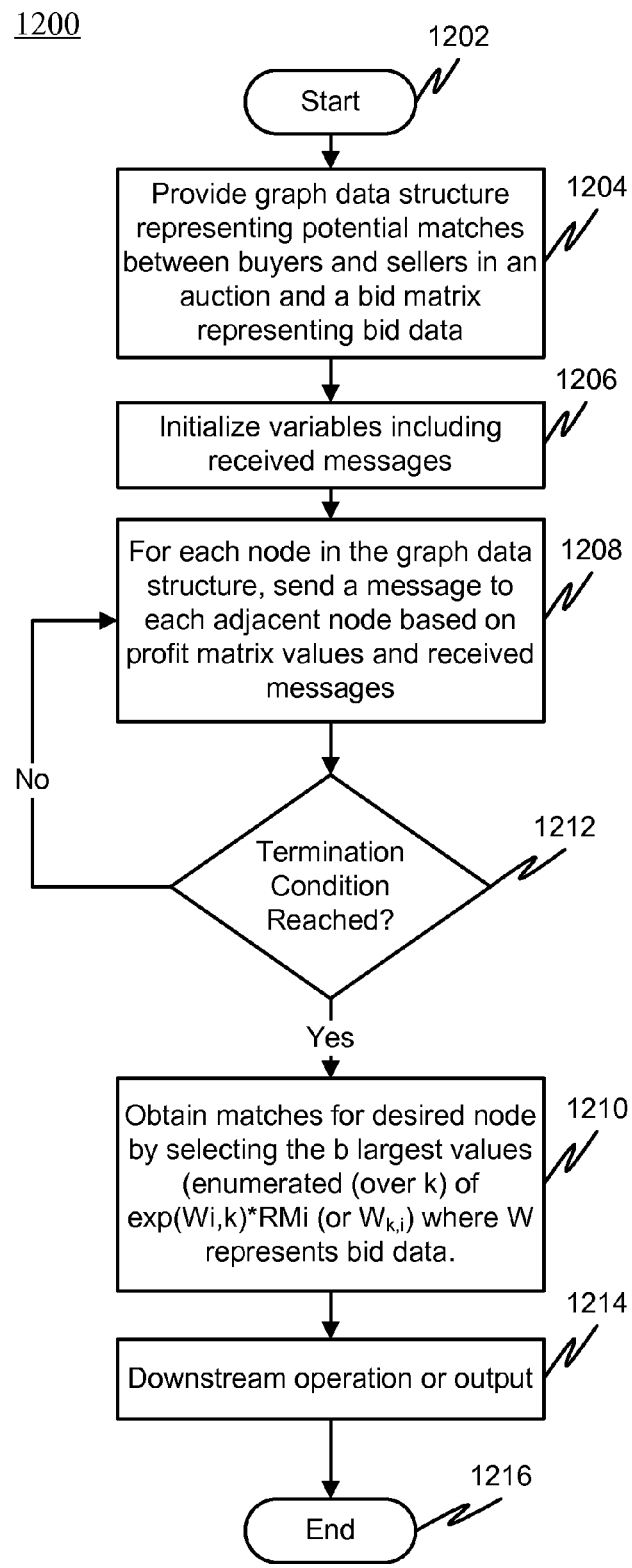
FIG. 12 is a chart of a method of matching sellers and buyers or goods/services to bids in an auction using belief propagation according to some embodiments of the disclosed subject matter.

FIG. 12 is a chart of a method of matching sellers and buyers in an auction using belief propagation according to some embodiments of the disclosed subject matter.

After beginning at 1202, a graph data structure is provided as indicated at 1204. The graph data structure nodes or vertices represents auction buyers and sellers, and their respective goods/services, to be matched. A profit matrix is also provided. The profit matrix represents a profit value for each seller node connected to a corresponding buyer node. At 1206, variables are initialized. The latter operation may include initializing values of data storage elements that store the values of the most recent messages received by the node.

Electronic messages are passed between adjacent or neighboring nodes as indicated at 1208. The details are not repeated since they are similar to the operations detailed above and below. The message passing can be performed iteratively until a termination condition is met. This is controlled by a branch point 1212.

Belief values for each neighboring node are updated based on received messages and stored as indicated at 1210. In this and the other embodiments, the belief values can be calculated once after the termination condition (as shown in the flow chart) or continuously updated prior to the termination condition. The operations are described above and below and are therefore not detailed here again.

If the termination condition has been reached, the b-matching buyer or seller nodes matching an input buyer/seller node are selected as indicated at 1214, otherwise control returns to 1208.

The selected nodes are matched based on sorted belief values at 1214. For example, in a b-matching problem, the b nodes having the highest belief values (i.e., profit values) with respect to an input node are selected. The selected nodes can be provided as output to another process or system. For example, the sellers corresponding to a selected buyer node can be displayed for the buyer (or vice versa). Processing then ends at 1216.

Figure 13:
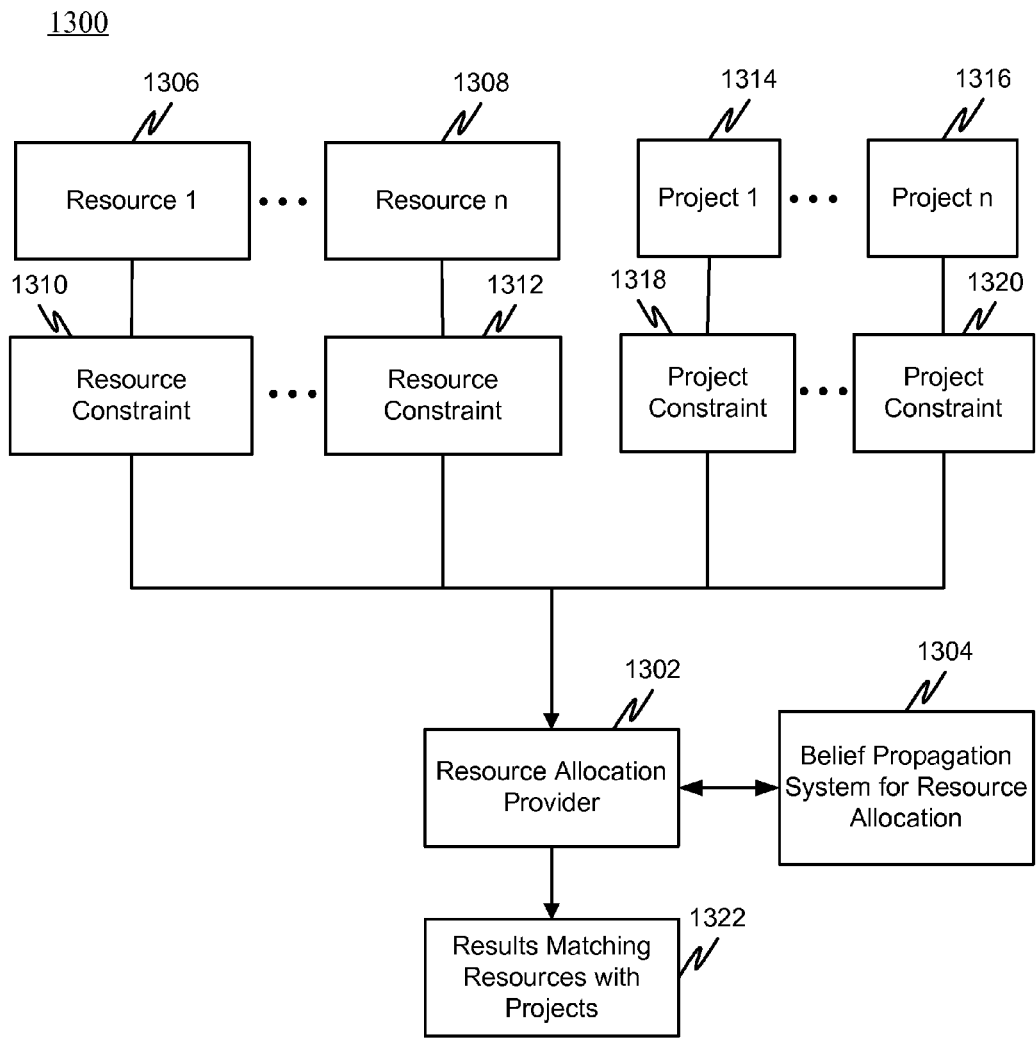
FIG. 13 is a diagram of a system for resource allocation using belief propagation according to some embodiments of the disclosed subject matter.

FIG. 13 is a diagram of a system for resource allocation using belief propagation according to some embodiments of the disclosed subject matter. In particular, the system 1300 includes a resource allocation provider 1302 that is coupled to a belief propagation system for resource allocation 1304. The resource allocation provider 1302 is also coupled to an electronic data store having stored therein data representing a plurality of resources (1306-1308) each having a respective set of resource constraints/goals (1310-1312), and a plurality of projects (1314-1316) each having a respective set of project constraints/goals (1318-1320). The resource allocation provider 1302 receives the resources (1306-1308) and resource constraints/goals (1310-1312), and the projects (1314-1316) and project constraints/goals (1318-1320), which can be used to generate a "profit" matrix for matching the resources with the projects. For example, resources may be reviewers for academic papers and the projects may be papers needing to be reviewed. The resources (reviewers) may indicate constraints such as only wanting to review a certain number of papers and may indicate goals such as a desired set of papers to review. The papers may have corresponding constraints such as needing to be reviewed by at least x reviewers. A profit matrix can be generated that includes the preferences of the reviewers as "profit" for matching them to a desired paper.

In response to the received resources (1306-1308) and resource constraints/goals (1310-1312), and projects (1314-1316) and project constraints/goals (1318-1320), the resource allocation provider 1302 performs resource allocation using the belief propagation system for resource allocation 1304 to match each project with b resources (e.g., such that the project's requirements are met and the resource's constraints are met), as described below with respect to FIG. 14. The b-matching resources may be assigned to the project that they are matched with in order to complete the project. For example, a results set 1322 that has the b-matching between projects and resources can be provided as output. Alternatively, the matches for a particular resource or project can be communicated directly to that resource or project.

In this example, the nodes of the graph data structure represent resources and projects. The profit matrix can have values based on a resource's desire for a project and/or limit of the number of projects that can be undertaken. For example, in the case of a resource, the b value can represent the number of projects that the resource can be committed to (e.g., the number of papers that a reviewer wishes to commit to reviewing). In the case of a project, the b value can represent the number of resources needed to meet the project constraint (e.g., each paper needs 3 reviewers). However, each node may also be subject to other constraints/goals on its belief value. These constraints may affect whether or not a resource/project is selected as matching for another resource/project, even if the profit for that matching is high enough that it would normally be selected.

Figure 14:
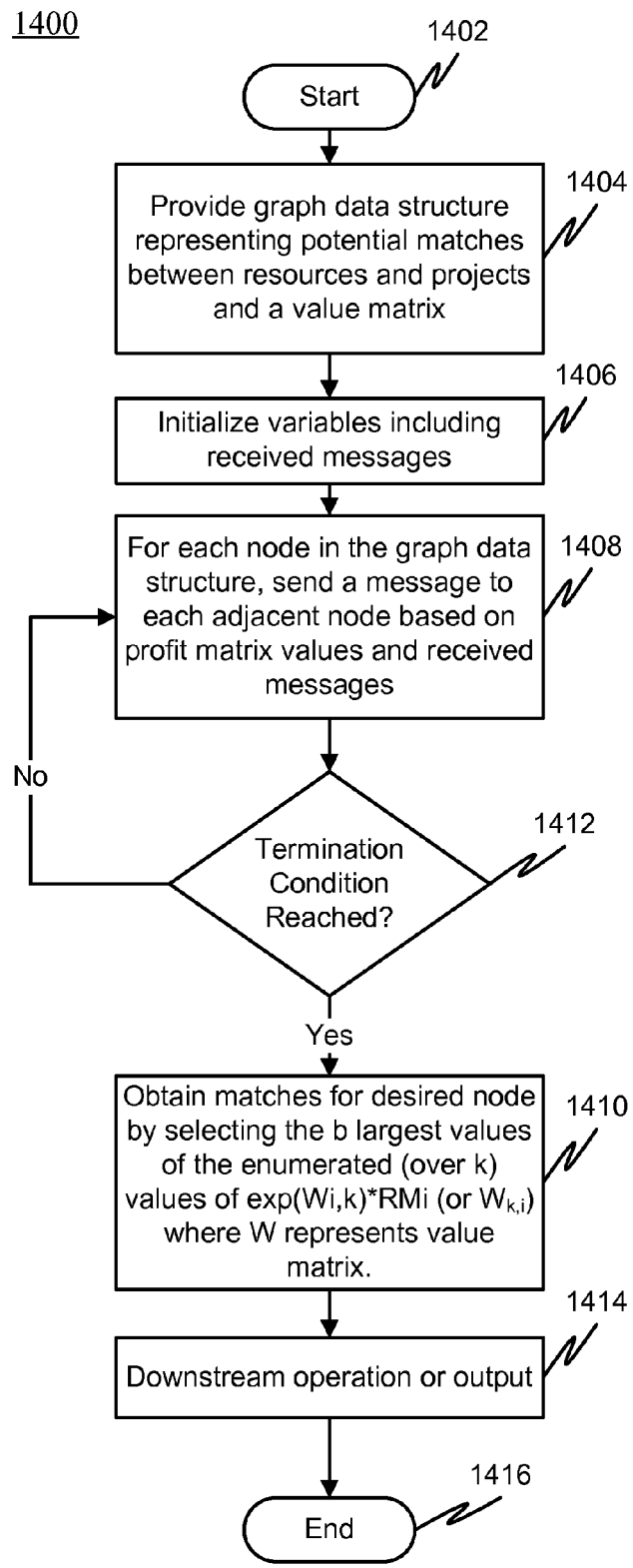
FIG. 14 is a chart of a method of resource allocation using belief propagation according to some embodiments of the disclosed subject matter.

FIG. 14 is a chart of a method of resource allocation using belief propagation according to some embodiments of the disclosed subject matter.

After beginning at 1402, a graph data structure is provided as indicated at 1404. The graph data structure nodes or vertices represent resources and projects, and their respective constraints/goals, to be matched. A profit matrix is also provided. The profit matrix represents a "profit" value for each resource node connected to a corresponding project node. At 1406, variables are initialized. The latter operation may include initializing values of data storage elements that store the values of the most recent messages received by the node.

Next, at 1408, electronic messages are passed between adjacent or neighboring nodes. The details are not repeated since they are similar to the operations detailed above and below. The message passing can be performed iteratively until a termination condition is met as indicated by the conditional branch at 1412.

At 1410, belief values for each neighboring node are updated based on received messages and stored. In this and the other embodiments, the belief values can be calculated once after the termination condition (as shown in the flow chart) or continuously updated prior to the termination condition. The operations are described above and below and are therefore not detailed here again.

If the termination condition has been reached, the b-matching resource or project nodes matching an input resource/project node are selected at 1414, otherwise, control returns to 1408. The selected nodes are matched based on sorted belief values at 1410. For example, in a b-matching problem, the b nodes having the highest belief values (i.e., profit values) with respect to an input node are selected. The selected nodes can be provided as output to another process or system. For example, the projects corresponding to a selected resource node can be displayed for the resource (or vice versa). Processing then ends at 1416.

Figure 15:
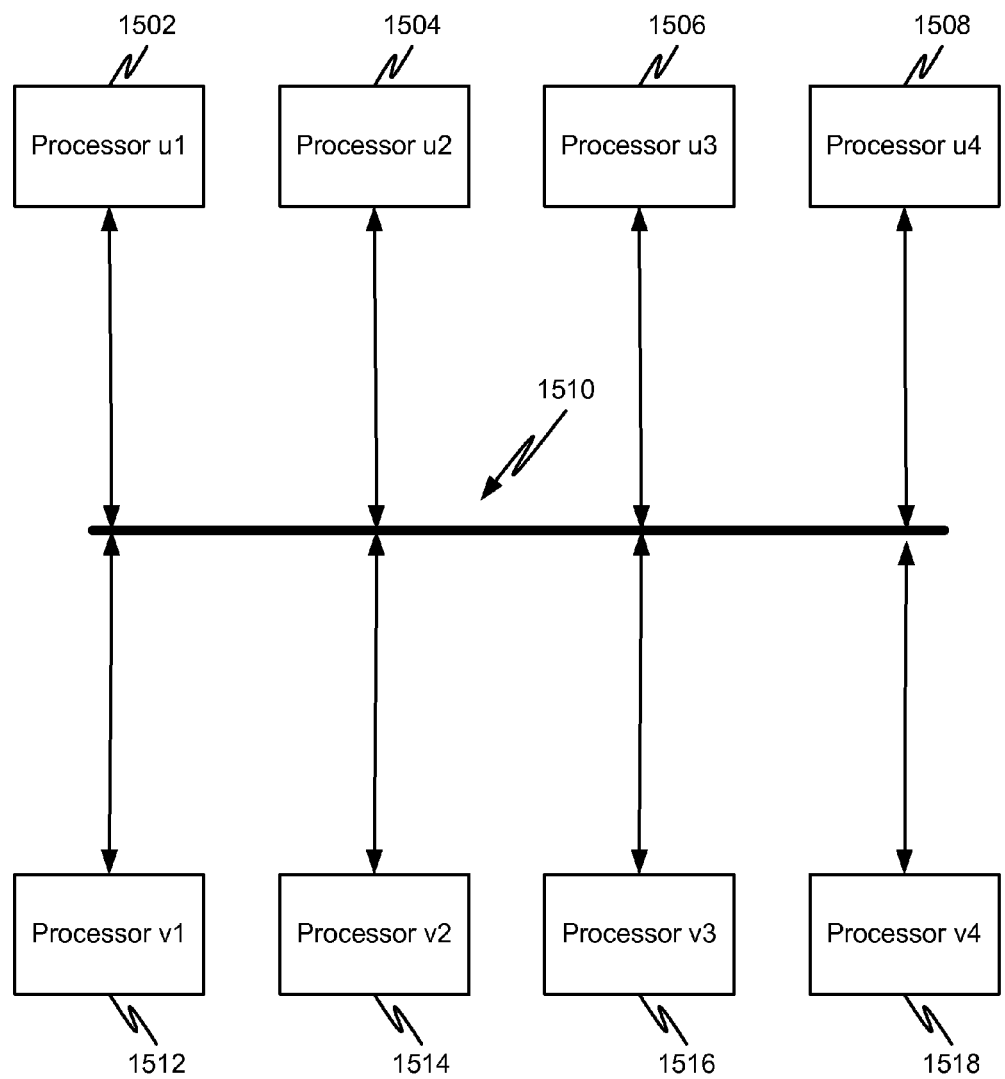
FIG. 15 is a diagram of a plurality of belief propagation processors according to some embodiments of the disclosed subject matter.

FIG. 15 is a diagram of a plurality of belief propagation processors implemented in hardware according to some embodiments of the disclosed subject matter. In particular, a system 1500 includes a plurality of belief propagation processors (1502-1508 and 1512-1518). Each of the processors is coupled to a bus 1510. The belief propagation processors are constructed for operating as nodes in a belief propagation system for generalized matching. The system 1500 can include processors that are stand-alone or can represent a single semiconductor device having multiple belief propagation processors constructed thereon.

Figure 16:
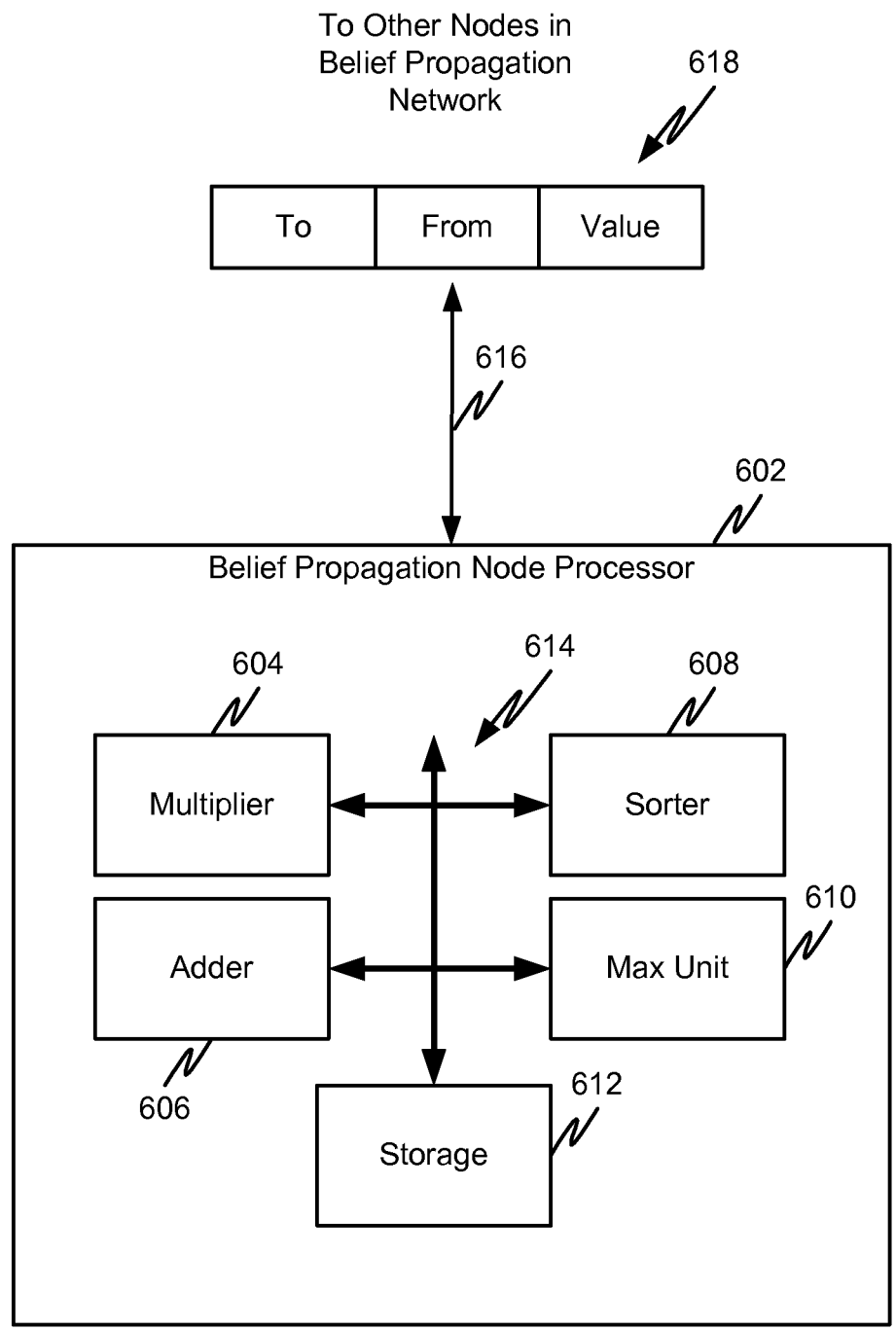
FIG. 16 is a diagram of a belief propagation processor according to some embodiments of the disclosed subject matter.

In operation, each hardware belief propagation processor performs the belief propagation method described above for a single node. The hardware details are shown in FIG. 16, which is a diagram of a hardware belief propagation processor according to some embodiments of the disclosed subject matter.

In particular, the hardware belief propagation processor 1602 includes a multiplier section 1604, an adder section 1606, a sorter section 1608, a max unit 1610, a storage 1612 each coupled to an internal bus 1614. The processor 1602 is coupled to an external bus 1616 in order to communicate with other processors and exchange messages 1618. The messages 1618 include a "to" field, a "from" field and a value field. The "to" field specifies an intended recipient node of the message, the "from" field specifies the sending node, and the value field contains the message value as calculated according to the message update process described above.

In operation, the processor 1602 receives (or otherwise detects) messages on the external bus 1616. When a message is intended for the processor 1602, the processor 1602 (receives if necessary and) stores it in the storage at a location corresponding to the sender node of the message. Processor 1602 can then calculate an updated message value to the nodes stored in its storage as neighbor or adjacent nodes and can send the updated messages to each corresponding neighbor node. The sections and units of the processor 1602 are used to perform the calculations required for determining updated messages and belief values. The processor 1602 can also transmit its b-matching nodes to another processor or system via the external bus 1616.

The processor 1602 may be implemented as a stand alone device or may be incorporated into a device having other circuitry including other belief propagation processor nodes.

The b value for matching mentioned above can be a constant value and the same for all nodes. Alternatively, each node can have an independent b value that can be different from that of the other nodes. Also, instead of being a constant value, the b value can be described as a distribution over a range of values. Problems with distributions of b-values (or degrees of connectedness between nodes) are known as degree distribution problems.

Examples of degree distribution problems include auctions where each buyer and seller may select an independent number (or capacity) of corresponding buyers/sellers or may have a range of capacities they can handle but incur different costs. Also a degree distribution problem can arise for cases in which the capacity changes over time, such as when a desired number of possible connections changes according to a quota which varies dynamically. Conventional approaches to solving b-matching problems may not be effective for solving degree distribution problems.

The belief propagation methods and systems of the disclosed subject matter, of either linear or distributed forms, can be used to solve degree distribution problems if the graph data structure and weight (or profit) matrix are adjusted according to the following technique.

Figure 17A:
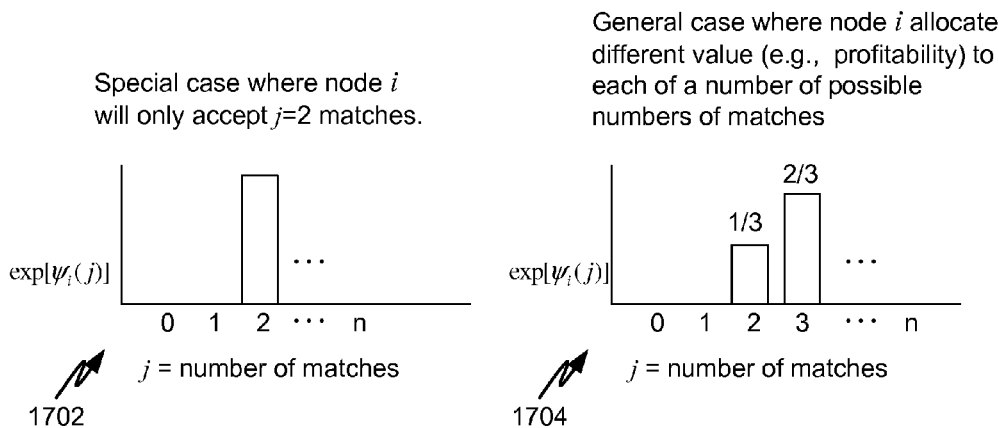
FIGS. 17A and 17B illustrate data and computational aspects of the handling of degree distribution matching opportunities which may be used to modify the structures and methods of the other embodiments, according to some embodiments of the disclosed subject matter.

Referring to FIG. 17A, as an example, an auction problem may have a group of n seller nodes each having a degree distribution $\psi_i(j)$ over n possible matches, where j refers to a particular number of matches that can be made (a variable version of b in the situation where the number of desired matches is a constant). Also, the problem may have a group of n buyer nodes each having a degree distribution $\phi_i(j)$ over n possible matches, where j, again, refers to a particular number of matches. The degree distributions $\psi_i(j)$ or $\phi_i(j)$ represent an apportionment of the desirability (or profitability or value) of the respective number (j) of matches.

A first example illustrates a special case 1702 in which each seller desires to indicate a particular number of matches it will accept. The number of acceptable matches may vary according to each seller and buyer. Sellers are represented in the example by $\psi_i(j)$ and buyers by $\phi_i(j)$. A second example 1704 illustrates the case of a seller j who may accept matches to 2 or 3 buyers but no other numbers of matches and he could set his degree distributions to reflect a profitability for 2 matches that is two times his profitability for 3 matches. This relative profitability might reflect operating costs above normal capacity to supply to 3 buyers, for example. The seller's actual or relative profit for matching to any given buyer is represented in the W matrix independently of the relative profitability reflected in the degree distribution. But the weight (profit) matrix values are discounted computationally as discussed below based on the relative profitability relating to the number of matches.

In the example 1704 of the seller, to make the calculation, the $\psi_i(j)$ and $\phi_i(j)$ are calculated in an expanded matrix (described below) as the natural logs of the relative profitabilities, namely, ⅓ and ⅔, requiring the sum over the degree distribution to be equal to 1. In that case, $\exp[\psi_i(2)]=⅔$ and $\exp[\psi_i(3)]=⅓$. Exponentials of all the other $\psi_i(j)$ will be zero. Then $\psi_i(2)=\ln(⅔)$ or $-0.405$ and $\psi_i(3)=\ln(⅓)$ or $-1.099$. All the other values of $\psi_i(j)$ may be set to very negative numbers, for example negative 10 million or their differentials, discussed below, set to zero or large numbers which would be equivalent as will be seen further below. The buyers can come to the same matching calculation and give completely different degree distributions for the same calculation resulting in the $\phi_i(j)$.

The degree distributions can be represented in any suitable way, for example, as tables corresponding to each buyer or seller node. As above, these may be stored in an electronic memory or multiple electronic memories in a distributed computation setting, respective to a particular node or respective to several nodes, but not all.

Figure 17B:
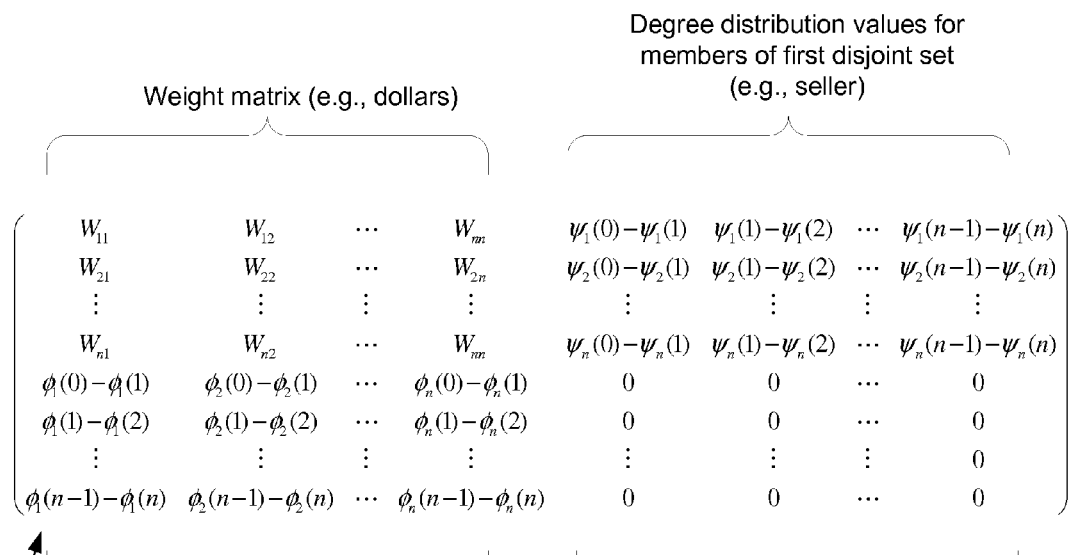

Referring to FIG. 17B, to solve the degree distribution problem, the weight matrix W that represents the value (or relative value) of each match, is expanded, doubling its size to generate an expanded weight matrix W'. The original weight matrix W (which reflects, for example, the negotiated price for a good to be sold by seller i to buyer k) forms the upper left quadrant of the expanded weight matrix W'. The upper right quadrant of the expanded weight matrix W' includes $\psi_i(j)$ delta values such as, starting at the first row: $\psi_1(0)-\psi_1(1), \ldots, \psi_1(n-1)-\psi_1(n)$, and so on until the last row $\psi_n(0)-\psi_n(1), \ldots, \psi_n(n-1)-\psi_n(n)$. The lower left quadrant of the expanded weight matrix W' includes $\phi_i(j)$ delta values such as, starting at the first row: $\phi_1(0)-\phi_1(1), \ldots, \phi_n(0)-\phi_n(1)$, and so on until the last row $\phi_1(n-1)-\phi_1(n), \ldots, \phi_n(n-1)-\phi_n(n)$. The lower right quadrant values can all be set to zero.

The bipartite graph is expanded by adding to the seller and buyer nodes, dummy nodes to double the number of sellers and buyers. Thus, if there are n buyers and n sellers, an additional n buyers and n sellers are appended. These dummy nodes correspond to the appended delta values $\psi_i(j)$, $\phi_i(j)$, or 0, respectively in the expanded weight matrix W'. In cases where the number of sellers differs from the number of buyers, the larger of the two is used as the expanded weight matrix size and the smaller side of the original weight matrix is expanded with small values (e.g., zero or negative maximum value) and dummy nodes are added to the graph data. These complete a square original and expanded weight matrix and original and expanded bipartite graph. The expanded nodes are dummy nodes similar to those used for the expanded weight matrix.

Once the expanded weight matrix W' is created and the dummy nodes are provided, the methods described above, for example with reference to FIGS. 2A through 2E, can be applied to the expanded graph and weight data. In distributed processing, the number of node processors may simply be doubled, for example, to have each processor operate and receive and send messages relating to a respective node. The value of b used for solving the problem may be set to n, namely, the number of buyers and sellers (noting that some of the buyers and sellers may be dummies and not real buyers or sellers). Once the matching problem is solved on the expanded graph using the expanded weight matrix W', as a b-matching problem, (b=n), according to the disclosed belief propagation methods and systems, the b-matching solution for the original graph and weight matrix is obtained by extracting the upper left quadrant of a matrix representing the matches on the expanded graph.

The b-matching solution may be represented as a binary matrix where each value in the matrix includes a 1 or 0, and where a 1 represents a matching between a buyer/seller pair corresponding to that element of the matrix, and a 0 corresponds to no match being made for that buyer/seller pair. The degree distribution technique is described in more detail with background and mathematical proofs in Appendix II.

As mentioned, the above approach can be applied in embodiments described above in which the matching problem is solved using multiple processors except that the number of processors may be doubled to process the larger number of disjoint sets. So in an example of matching buyers to sellers, there would be twice the number of buyer processors and twice the number of seller processors with half of each being assigned to the dummy nodes.

In some of the above embodiments relating to the assignment of web advertisements according to bids, various factors can be used to modify the weight value of the weight matrix used to represent the matching problem. These can include: click through rate; how many times a user selects a given ad in a given session; a duration of time, from an ad result selection, until the user issues another search query, which may include time spent on other pages (reached via a search result click or ad click) subsequent to a given ad click; a ratio of the time, from a given ad result selection until a user issues another search query, as compared to all other times from ad result selections until the user issued another search query; time spent, given an ad result selection, on viewing other results for the search query, but not on the given ad result; how many searches (i.e., a unique issued search query) that occur in a given session prior to a given search result or ad selection; how many searches that occur in a given session after a given search result or ad selection; rather than searches, how many result page views that occur for a given search query before a given selection, this can be computed within the query (i.e., just for a unique query), or for the entire session; and rather than searches, how many search result page views that occur for a given search query after this selection, this can be computed within the query (i.e., just for the unique query), or for the entire session.

Embodiments of the method, system, one or more computers program product and one or more computers readable media for generalized matching using belief propagation, may be implemented on a general-purpose one or more computers, a special-purpose one or more computers, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or processes described herein can be used to implement embodiments of the method, system, or one or more computers program product for generalized matching using belief propagation.

Furthermore, embodiments of the disclosed method, software, and one or more computers program product (or one or more computer readable media) for generalized matching using belief propagation may be readily implemented, fully or partially, in software using, for example, object or object-oriented software development environments that provide portable source code that can be used on a variety of one or more computers platforms. Alternatively, embodiments of the disclosed method for correcting generalized matching using belief propagation can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or one or more computers system being utilized. Embodiments of the method, system, and one or more computer program products for generalized matching using belief propagation can be implemented in hardware and/or software using any known or later developed systems or structures, devices and/or software by those of ordinary skill in the applicable art from the functional description provided herein and with a general basic knowledge of the one or more computers arts.

Moreover, embodiments of the disclosed method for generalized matching using belief propagation can be implemented in software stored on one or more computer readable media (or provided as one or more computer program products) and adapted to be executed on a programmed general-purpose one or more computers, a special purpose one or more computers, a microprocessor, or the like. Also, the generalized matching using belief propagation method of this invention can be implemented as a program embedded on a personal one or more computers such as a JAVA® or CGI script, as a resource residing on a server or graphics workstation, as a routine embedded in a dedicated processing system, or the like. The method and system can also be implemented by physically incorporating the method for generalized matching using belief propagation into a software and/or hardware system, such as the hardware and software systems of a search engine, online auction, online dating, resource allocation, or image processing system.

Note that while many of the operations described herein are described in terms of mathematical functions and operations, such functions and operations can be approximated while still permitting the solutions of the respective problems to be achieved. For example, the exponential function, multiplication functions, and/or logarithmic functions may have computational analogs or approximations that may be used to implement them. Thus, in using the mathematical terms in the above discussion it should be understood that the embodiments include those in which such approximations are used.

Note that in all embodiments where a system or component loads software or data from a storage device or computer readable media, it will be understood that modifications of such embodiments are possible and considered within the embodiments of the disclosed subject matter. For example, data may be read from a stream provided by a remote data storage device operating according to any principle including volatile or nonvolatile memory. An "Internet drive," network attached storage, distributed storage, or any other suitable device may also be used.

It is, therefore, apparent that there is provided in accordance with the present invention, a method, system, one or more computer program products and one or more computer readable media with software for generalized matching using belief propagation. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

APPENDIX I

[00108] If the weight matrix 118 is $A$ such that the weight of any edge 106, 108 $(u_i, v_j)$ is $A_{ij}$, the potential matchings are defined by the function $M(u_i)$ or $M(v_j)$ where the function $M$ returns the set of neighbor vertices (or nodes) of the input vertex (or node). The $b$-matching objective can be written as:

$$W(M) = \max_M \sum_{i=1}^{n} \sum_{v_k \in M(u_i)} A_{ik} + \sum_{j=1}^{n} \sum_{u_l \in M(v_j)} A_{lj} \quad (1)$$

$$s.t. \quad |M(u_i)| = b, \forall i \in \{1,\ldots,n\}$$
$$|M(v_j)| = b, \forall j \in \{1,\ldots,n\}$$

[00109] Defining the variables $x_i \in X$ and $y_j \in Y$ for each vertex such that $x_i = M(u_i)$ and $y_j = M(v_j)$, the following potential functions can be defined:

$$\phi(x_i) = \exp(\sum_{v_j \in x_i} A_{ij}), \quad \phi(y_j) = \exp(\sum_{u_i \in y_j} A_{ij});$$

and a clique function can be defined:

$$\psi(x_i, y_j) = \neg(v_j \in x_i \oplus u_i \in y_j). \quad (2)$$

[00110] Using the potentials and clique function, the weighted $b$-matching objective can be written as a probability distribution $p(X,Y) \propto \exp(W(M))$.

$$p(X,Y) = \frac{1}{Z} \prod_{i=1}^{n} \prod_{j=1}^{n} \psi(x_i, y_j) \prod_{k=1}^{n} \phi(x_k) \phi(y_k) \quad (3)$$

[00111] The probability function (3) above is maximized using the max-product algorithm. The max-product algorithm iteratively passes messages between dependent variables and stores beliefs, which are estimates of max-marginals. Conventionally, messages are represented by vectors over settings of the variables. The following are the update equations from $x_i$ to $y_j$.

$$m_{x_i}(y_j) = \frac{1}{Z} \max_{x_i} \left[ \phi(x_i) \psi(x_i, y_j) \prod_{k \neq j} m_{y_k}(x_i) \right]$$

$$b(x_i) = \frac{1}{Z} \phi(x_i) \prod_{k} m_{y_k}(x_i)$$

[00112] Direct belief propagation on larger graphs using the above equations converges, but may not be suitable due to the number of possible settings for each variable.

[00113] In order to quickly solve a $b$-matching problem using belief propagation, while still maintaining algorithm guarantees, several improvements over conventional direct belief propagation are needed. Three features of the above equations are exploited in order to allow the messages to be represented as scalars.

[00114] First, $\psi$ functions are well structured, and their structure causes the maximization term in the message updates to always be one of two values.

$$m_{x_i}(y_j) \propto \max_{v_j \in x_i} \phi(x_i) \prod_{k \neq j} m_{y_k}(x_i), \text{ if } u_i \in y_j$$

$$m_{x_i}(y_j) \propto \max_{v_j \notin x_i} \phi(x_i) \prod_{k \neq j} m_{y_k}(x_i), \text{ if } u_i \notin y_j \quad (4)$$

[00115] This is because the $\psi$ function changes based only on whether the setting of $y_j$ indicates that $y_j$ shares an edge with $u_i$. Furthermore, if we redefine the above message values as two scalars, we can write the messages more specifically as $$\mu_{x_i y_j} \propto \max_{v_j \in x_i} \phi(x_i) \prod_{u_k \in x_i \setminus v_j} \mu_{ki} \prod_{u_k \notin x_i \setminus v_j} v_{ki}$$

$$v_{x_i y_j} \propto \max_{v_j \notin x_i} \phi(x_i) \prod_{u_k \in x_i \setminus v_j} \mu_{ki} \prod_{u_k \notin x_i \setminus v_j} v_{ki} \quad (5)$$

[00116] Second, since the messages are unnormalized probabilities, we can divide any constant from the vectors without changing the result. We divide all entries in the message vector by $v_{x_i y_j}$ to get $$\hat{\mu}_{x_i y_j} = \frac{\mu_{x_i y_j}}{v_{x_i y_j}} \text{ and } \hat{v}_{x_i y_j} = 1.$$

[00117] This lossless compression scheme simplifies the storage of message vectors from length $\binom{n}{b}$ to 1.

The $\phi$ functions are rewritten as a product of the exponentiated $A_{ij}$ weights and eliminate the need to exhaustively maximize over all possible sets of size $b$. Inserting Equation (2) into the definition of $\hat{\mu}_{x_i y_j}$ gives $$\hat{\mu}_{x_i y_j} = \frac{\max_{j \in x_i} \phi(x_i) \prod_{k \in x_i \setminus j} \hat{\mu}_{ki}}{\max_{j \notin x_i} \phi(x_i) \prod_{k \in x_i \setminus j} \hat{\mu}_{ki}}$$

$$= \frac{\max_{j \in x_i} \prod_{k \in x_i} \exp(A_{ik}) \prod_{k \in x_i \setminus j} \hat{\mu}_{ki}}{\max_{j \notin x_i} \prod_{k \in x_i} \exp(A_{ik}) \prod_{k \in x_i \setminus j} \hat{\mu}_{ki}}$$

$$= \frac{\exp(A_{ij}) \max_{j \in x_i} \prod_{k \in x_i \setminus j} \exp(A_{ik}) \hat{\mu}_{ki}}{\max_{j \notin x_i} \prod_{k \in x_i} \exp(A_{ij}) \hat{\mu}_{ki}}$$

[00118] We cancel out common terms and are left with the simple message update process, $$\hat{\mu}_{x_i y_j} = \frac{\exp(A_{ij})}{\exp(A_{i\ell}) \hat{\mu}_{y_\ell x_i}}$$

[00119] Here, the index $\ell$ refers to the $b$ th greatest setting of $k$ for the term $\exp(A_{ik}) m_{yk}(x_i)$, where $k \neq j$. This compressed version of a message update can be computed in $O(bn)$ time.

[00120] We cannot efficiently reconstruct the entire belief vector but we can efficiently find its maximum.

$$\max_{x_i} b(x_i) \propto \max_{x_i} \phi(x_i) \prod_{k \in x_i} \hat{\mu}_{y_k x_i}$$

$$\propto \max_{x_i} \prod_{k \in x_i} \exp(A_{ik}) \hat{\mu}_{y_k x_i}$$

Finally, to maximize over $x_i$ we enumerate $k$ and greedily select the $b$ largest values of $\exp(A_{ik}) \hat{\mu}_{y_k x_i}$.

[00121] The procedure avoids enumerating all $\binom{n}{b}$ entries in the belief vector, and instead reshapes the distribution into a $b$ dimensional hypercube. The maximum of the hypercube is found efficiently by searching each dimension independently. Each dimension represents one of the $b$ edges for node $u_i$. In other words, the above procedure makes it possible to select the largest b matches for each node as the solution, without having to compare all of the node combinations.

Appendix II

Graph Structure Estimation with Degree Distributions

Abstract

We describe a generative model for graph structures that incorporates local edge potentials as well as degree-dependent potentials. If the degree probabilities are log-concave, the most likely graph structure under our model's distribution can be found efficiently by mapping the problem into a combinatorial optimization known as $b$-matching. We provide concentration bounds for data sampled from a generative model for recommendation matrices, which can be used as degree potentials. Finally, we demonstrate that, by adding these degree dependencies, we are able to improve upon existing prediction methods.

1 INTRODUCTION

This article describes a method of estimating graph structure and applies this method to the task of predicting binary recommendation matrices. We provide two main contributions: (1) a probability distribution over graph edge structures that yields an efficient inference method, and (2) concentration bounds for data sampled from a generative model for recommendation matrices. The bounds we detail can be directly applied to characterize the edge distribution of a user-product recommendation graph, leading to improved accuracy over current methods.

We develop a particular distribution over graphs that uses factorization assumptions and incorporates distribution priors over node degrees. More importantly, this distribution allows for the efficient recovery of the most likely subgraph from the set of all possible graphs. The maximum a posteriori (MAP) estimate under this distribution is shown to be equivalent to the combinatorial problem known as $b$-matching, which is solvable in polynomial time.

Because our framework can handle any set of log-concave degree distributions, we provide a strict generalization of $b$-matching and more general maximum weight degree constrained subgraph optimizations, in which all nodes must have some pre-specified degrees. In our formulation can implement $b$-matching constraints by using delta functions for the degree distribution. Similarly, if we use uniform degree distributions, we obtain $bd$-matching [2].

1.1 PREVIOUS WORK

Previous work on denoising edge observations uses a similar distribution over edges to ours, but the authors of [8] use loopy belief propagation to obtain approximate marginals and perform approximate inference. This article indicates that, in some settings, MAP estimation over subgraphs under degree constraints can be solved exactly in polynomial time.

Collaborative filtering in recommendation systems is the task of predicting the preferences of users for products from previous rating data. The common approach assumes that the rating matrix over the users and items is assumed to be low rank; Each (user,item) entry of the matrix is an inner product of a small number of features describing a user and a small number of features describing each the item. Therefore, the task is to complete the unobserved entries so that the full matrix can be factorized into low-dimensional factors. Unfortunately explicit low-rank approximations have local minima and several relaxations have been proposed. For instance, low-rank solutions may be obtained by minimizing the norm of the decomposition matrices using a semi-definite program (SDP), as in the maximum-margin matrix factorization (MMMF) framework [9, 12]. This optimization is cast as a gradient descent algorithm, which allows it to scale to very large datasets [10]. In addition to finding low rank decompositions of the rating matrix, it has proven useful to model the variation in rating behavior of the users, or more explicitly, the highly variable scaling effects on the ratings due to each user's subjectivity in producing absolute estimates for ratings [5]. For example, the strongest variant of MMMF predicts not only the rating matrix, but also a set of thresholds adapted for each user. This allows different users to use different rating scales and avoids the impractical requirement that a common calibrated rating scale is being followed by all users [9].

Because preference data is typically volunteered by users, the distribution of observable ratings is different from the full distribution of all user-product pairs [6]. Learning about this full distribution from which we have no data is a difficult challenge for the collaborative filtering community. In this paper, we only work with the distribution of visible entries, since we benchmark our method using the same volunteered data anyway. [1]

Our method takes advantage of previous results on the combinatorial optimizations in the families of generalized matchings. This includes standard matching and $b$-matching. In these problems, we are given a graph with weighted edges, and hard constraints on the degrees of the nodes. The task is to find the subgraph that fits the degree constraints that maximizes edge weight. Classical algorithms such as the equivalent balanced network flow problem [2] are known to solve $bd$-matchings in $O(n^3)$ time. Newer belief propagation algorithms can solve bipartite $b$-matchings in the same asymptotic running time but thousands of times faster in practice [1, 3, 11].

---

[1]There are some applications that will still benefit from learning from only the observable distribution. For example, a recommendation system could only give its predicted rating to a user after the user has selected the product (for purchase or otherwise). A user would be able to cancel her order if the predicted recommendation is low.

1.2 OUTLINE

This paper is organized as follows: In Section 2, we describe the generative model for graph structure and detail the mapping to a $b$-matching. In Section 3, we derive a concentration bound for the row and column means of preference matrices (or, equivalently, in-degree and out-degree bounds for each node), which can be used as degree priors. In Section 4, we describe some empirical results, including a graph reconstruction and recommendation matrix completion experiments. Finally, we conclude in Section 5 with a brief discussion.

2 EDGE GENERATIVE MODEL

We begin by writing a distribution over all possible subgraphs, which involves terms that factorize across (a) edges (to encode independent edge weight) and (b) degree distribution terms that tie edges together, producing dependencies between edges. The probability of any candidate edge set $\hat{E} \subseteq E$ can be expressed as $$\ln \Pr(\hat{E}|G) = \sum_{e \in \hat{E}} \phi(e) + \sum_{v_i \in V} \psi_i(\deg(v_i, \hat{E})) - \ln Z \quad (1)$$

The edge potentials can also be represented by a symmetric potential matrix $W$ where $W_{ij}$ is the potential of edge $(v_i, v_j)$. The function $\deg(v_i, \hat{E})$ returns the number of edges in $\hat{E}$ that are adjacent to node $v_i$. Thus, this probability puts different local preferences on the edges via edge weights but also enforces more global structural knowledge about the likelihood of a subgraph by imposing degree distributions. Unfortunately, due to the large number of edges implicated in each degree distribution term $\psi_i$, the probability model above has large tree-width. Therefore, exact inference and naive MAP estimation procedures (for instance, using the junction tree algorithm) can scale exponentially with $n$. Fortunately, we will be able to show that concavity assumptions on $\psi_i$ can lead to efficient polynomial time MAP estimation.

2.1 ENCODING AS A $b$-MATCHING

If we also enforce concavity of the $\psi_i$ functions in Equation 1, the above probability can be maximized by solving a $b$-matching. Formally, we define concavity as $$\begin{aligned}
\delta\psi_i(k) &= \psi_i(k) - \psi_i(k-1) \\
\delta^2\psi_i(k) &= \delta\psi_i(k) - \delta\psi_i(k-1) \\
&= \psi_i(k) - \psi_i(k-1) - \\
&\quad (\psi_i(k-1) - \psi_i(k-2)) \leq 0.
\end{aligned}$$

If degree potentials conform to these concavity constraints, we can exactly mimic the probability function $\Pr(\hat{E}|G)$, which manipulates subgraphs $\hat{E}$ of $G$ with soft degree priors, with another equivalent probability function $\Pr(\hat{E}'|G')$. This larger yet equivalent probability involves a larger graph $G'$ and larger subgraphs $\hat{E}'$. The key simplification will be that the larger subgraphs will have to satisfy hard degree constraints for each node (or priors that are delta functions on the degrees) on its in-degree and its out-degree (as opposed to a soft distribution over allowable degrees).

Our construction proceeds as follows. First create a new graph $G'$, which contains a copy of the original graph $G$, as well as additional dummy nodes denoted $D$. We will use these dummy nodes to mimic the role of the soft degree potential functions $\psi_1, \ldots, \psi_n$. For each node $v_i$ in our original set $V$, we introduce a set of dummy nodes. We add one dummy node for each edge in $E$ that is adjacent to each $v_i$. In other words, for each node $v_i$, we will add dummy nodes $d_{i,1}, \ldots, d_{i,N_i}$ where $N_i = \deg(v_i, E)$ is the size of the neighborhood of node $v_i$. Each of the dummy nodes in $d_{i,1}, \ldots, d_{i,N_i}$ is connected to $v_i$ in the graph $G'$. We now have a new graph $G' = \{V', E'\}$, defined as follows:

$$D = \{d_{1,1}, \ldots, d_{1,N_1}, \ldots, d_{n,1}, \ldots, d_{n,N_n}\},$$
$$V' = V \cup D,$$
$$E' = E \cup \{(v_i, d_{i,j}) | 1 \leq j \leq N_i, 1 \leq i \leq n\}.$$

We next specify the weights of the edges in $G'$. First, set the weight of each edge $e$ copied from $E$ to its original potential, $\phi(e)$. Next, we set the edge weights between the original nodes and dummy nodes. The following formula defines the weight between the original node $v_i$ and the dummy nodes $d_{i,1}, \ldots, d_{i,N_i}$ that were introduced due to the neighborhood of $v_i$:

$$w(v_i, d_{i,j}) = \psi_i(j-1) - \psi_i(j). \qquad (2)$$

While the $\psi$ functions have outputs for $\psi(0)$, there are no dummy nodes labeled $d_{i,0}$ associated with that setting ($\psi(0)$ is only used when defining the weight of $d_{i,1}$). Note that by construction, the weights $w(v_i, d_{i,j})$ are monotonically non-decreasing with respect to the index $j$ due to the concavity of the $\psi$ functions:

$$\begin{aligned}\psi_i(j) - \psi_i(j-1) &\leq \psi_i(j-1) - \psi_i(j-2) \\ -w(v_i, d_{i,j}) &\leq -w(v_i, d_{i,j-1}) \\ w(v_i, d_{i,j}) &\geq w(v_i, d_{i,j-1}).\end{aligned} \qquad (3)$$

We mimic the probability function $\Pr(\hat{E}|G)$ in Equation 1 over edges in $G$ with a probability function on $G'$ called $\Pr(\hat{E}'|G')$. However, the probability function on $G'$ enforces hard degree constraints on the hypothesized edges $\hat{E}'$. Specifically, for the (original) nodes $v_1, \ldots, v_n$ each node $v_i$ has to have exactly $N_i$ neighbors (including any dummy nodes it might connect to). Furthermore, all dummy nodes $D$ in $G'$ have no degree constraints whatsoever. It is known that such probability functions on $\Pr(\hat{E}'|G')$ with exact degree constraints can be maximized using combinatorial methods [2] as well as belief propagation [1, 3, 11].

The proposed approach recovers the most likely subgraph $\hat{E}' = \arg\max_{\hat{E}'} \Pr(\hat{E}'|G')$ as follows:

$$\hat{E}' = \arg\max_{\hat{E}' \subseteq E'} \sum_{(v_i, d_{i,j}) \in \hat{E}'} w(v_i, d_{i,j}) \quad (4)$$

$$\text{subject to} \quad \deg(v_i, \hat{E}') = N_i \text{ for } v_i \in V.$$

In other words, we are free to choose any graph structure in the original graph, but we must exactly meet the degree constraints by selecting dummy edges maximally.

Theorem 1. *The total edge weight of degree-constrained subgraphs $\hat{E}' = \arg\max_{\hat{E}'} \log \Pr(\hat{E}'|G')$ from graph $G'$ differs from $\log \Pr(\hat{E}' \cap E|G)$ by a fixed additive constant.*

*Proof.* Consider the edges $\hat{E}' \cap E$. These are the estimated connectivity $\hat{E}$ after we remove dummy edges from $\hat{E}'$. Since we set the weight of the original edges to the $\phi$ potentials, the total weight of these edges is exactly the first term in (1), the local edge weights.

What remains is to confirm that the $\psi$ degree potentials agree with the weights of the remaining edges $\hat{E}' \setminus \hat{E}' \cap E$ between original nodes and dummy nodes.

Recall that our degree constraints require each node in $G'$ to have degree $N_i$. By construction, each node $v_i$ has $2N_i$ available edges from which to choose: $N_i$ edges from the original graph and $N_i$ edges to dummy nodes. Moreover, if $v_i$ selects $k$ original edges, it maximally selects $N_i - k$ dummy edges. Since the dummy edges are constructed so their weights are non-increasing, the maximum $N_i - k$ dummy edges are to the last $N_i - k$ dummy nodes, or dummy nodes $d_{i,k+1}$ through $d_{i,N_i}$. The proof is complete if we can show the following:

$$\sum_{j=k+1}^{N_i} w(v_i, d_{i,j}) - \sum_{j=k'+1}^{N_i} w(v_i, d_{i,j}) \stackrel{?}{=} \psi_i(k) - \psi_i(k').$$

Terms in the summations cancel out to show this equivalence. Substituting the definition of $w(v_i, d_{i,j})$, $$\sum_{j=k+1}^{N_i} (\psi_i(j-1) - \psi_i(j)) - \sum_{j=k'+1}^{N_i} (\psi_i(j-1) - \psi_i(j))$$

$$= \sum_{j=k}^{N_i} \psi_i(j) - \sum_{j=k+1}^{N_i} \psi_i(j) - \sum_{j=k'}^{N_i} \psi_i(j) + \sum_{j=k'+1}^{N_i} \psi_i(j)$$

$$= \psi_i(k) - \psi_i(k')$$

This means the log-probability and the weight of the new graph change the exact same amount as we try different subgraphs of $G$. Therefore, for any degree constrained subgraph $\hat{E}'$ the quantities $\hat{E}' = \arg\max_{\hat{E}'} \log \Pr(\hat{E}'|G')$ and $\log \Pr(\hat{E}' \cap E|G)$ differ only by a constant. □

In practice, we find the maximum weight degree constrained subgraph to maximize $\Pr(\hat{E}'|G')$ using classical maximum flow algorithms [2] which require $\mathcal{O}(n|E|)$ computation time. In the special case of bipartite graphs, we can use a belief propagation algorithm [1, 3, 11] which is significantly faster. Furthermore, since the dummy nodes have no degree constraints, we only need to instantiate $\max_i(N_i)$ dummy nodes and reuse them for each $v_i$. The process described in this section is illustrated in Figure 1.

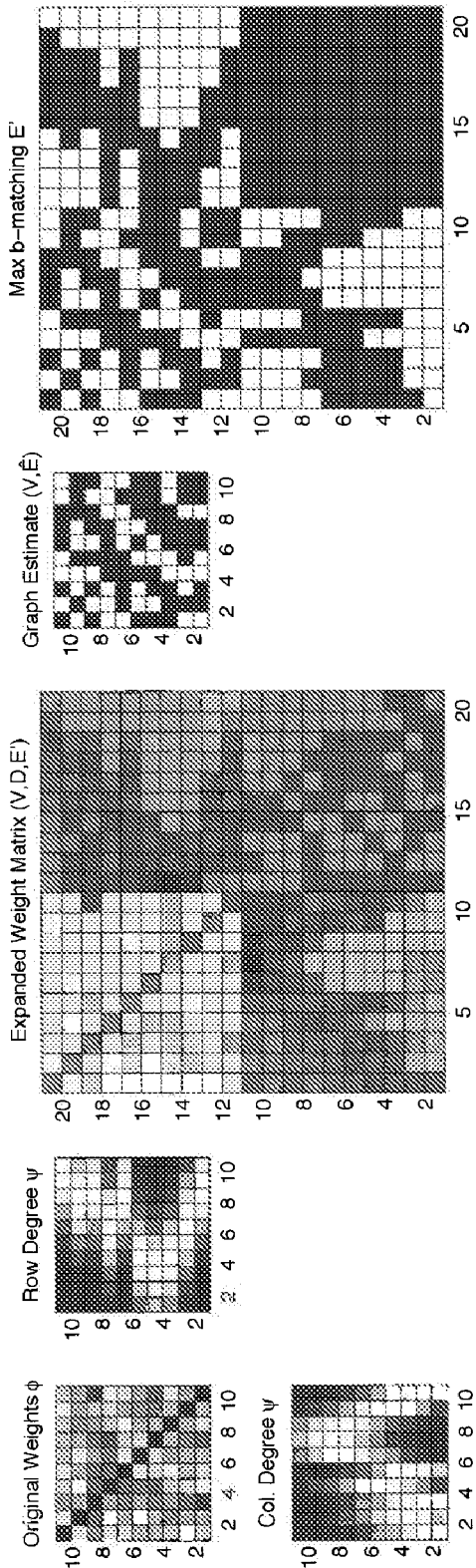

Figure 1: Example of mapping a degree dependent problem to a hard-constrained $b$-matching. Left: Original weight matrix and row/column degree distributions. Middle: Weight matrix of expanded graph, whose solution is now constrained to have exactly 10 neighbors per node. Right: The resulting $b$-matching, where the upper left quadrant can be pulled out as the solution to the original problem.

3 PREFERENCE MATRICES

In most settings, we may have weights for each edge but have no immediate access to degree distribution information about the nodes. In this section we will show (after assuming a reasonable model of graphs or preference matrices) that one can obtain such information from partially observing a graph and show that these partial empirical measurements will lead to conccceconcentration guarantees on the degree distribution.

Consider a graph treatment of collaborative prediction data such as preference matrices which can be seen as a bipartite graph. We are interested in providing theoretical bounds from such a graph or preference matrix that will act as surrogate information for exact knowledge of the degree priors detailed in the previous section. Typically, collaborative prediction data is in the form of an anonymized rating matrix $Y$, such that the entry $Y_{ij}$ represents the rating user $i$ provided for product $j$. We consider the case of binary ratings, or alternately, thresholded multi-valued ratings.

In this setting, it is natural to consider the rating matrix a bipartite graph between sets of $n$ user nodes $U$ and $m$ product nodes $V$. Positive edges represent that a user recommends a product and negative edges represent that a user does not recommend a product. Non-edges indicate that there is no data between a user and a product. In this setting, the collaborative prediction task becomes the following: We are given a set of $U$ and $V$ nodes and a set of positive and negative training edges, $E_{\text{tr}} = (E_{\text{tr}}^+ \cup E_{\text{tr}}^-)$. Given another set of test edges $E_{\text{te}}$, predict the subgraph of positive query edges ($E_{\text{te}}^+ \subseteq E_{\text{te}}$) that most accurately represent the true test recommendations.

We will present a generative model for such rating matrices or bipartite graphs. Each user and each product is represented by a $d$-dimensional vector. Denote each user vector $\bar{\mu}_i \in [0,1]^d$ and each product vector $\bar{\nu}_j \in [0,1]^d$. The probability of a positive recommendation is defined as $$\Pr(Y_{ij} = +1 \mid \bar{\mu}_i, \bar{\nu}_j) = \frac{1}{d} \sum_{k=1}^{d} \bar{\mu}_i(k) \bar{\nu}_j(k) = \frac{1}{d} \bar{\mu}_i^T \bar{\nu}_j.$$

(5)

Assume we sample the recommendations independently from the above probability distributions. Furthermore, we assume that each $\bar{\mu}$ user vector is drawn iid from some population distribution $\mathbb{D}_\mu$ and each product vector $\bar{\nu}$ is drawn iid from some product distribution $\mathbb{D}_\nu$. We make no parametric assumptions about these two distributions.

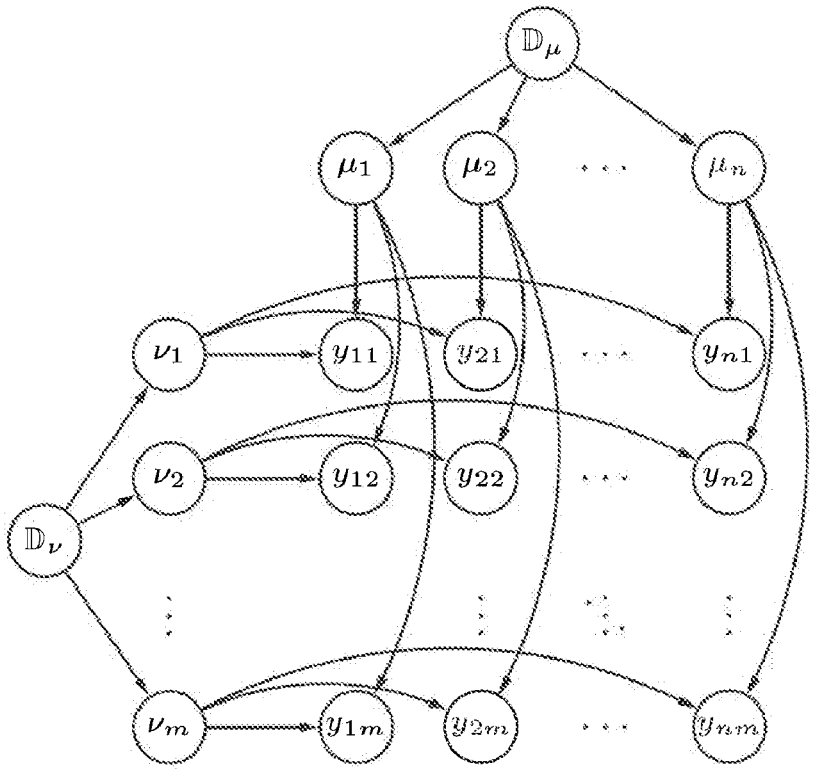

Figure 2: Graphical representation of the rating generative function described in Equation 5

3.1 DEVIATION BOUNDS

Since the ratings are generated by such a structured model, classical concentration bounds do not apply directly to bound the average ratings in the training data to the average ratings in the testing data. However, under the mild assumption that each user and each product is sampled iid, we are able to derive new deviation bounds.

We consider the deviation between the average ratings of a user in training data from the average ratings in testing data. Let $n_i$ denote the number of training ratings and $\hat{n}_i$ the number of ratings being queried. In other words, $n_i = \deg(u_i, E_{\text{tr}}^+)$ and $\hat{n}_i = \deg(u_i, E_{\text{te}}^+)$. Without loss of generality, let the first $n_i$ ratings be training ratings and the last $\hat{n}_i$ ratings be testing. The deviation can be written as the function $$f(Y_{i,1}, \ldots, Y_{i,n_i+\hat{n}_i}) = \frac{1}{n_i}\sum_{j=1}^{n_i} Y_{ij} - \frac{1}{\hat{n}_i}\sum_{j=n_i+1}^{n_i+\hat{n}_i} Y_{ij}. \quad (6)$$

We are interested in finding $\Pr(|f| \geq \epsilon)$, for some constant confidence interval $\epsilon$.

Theorem 2. *Given two random sample sets of entries across a single row or a single column from a recommendation matrix generated by the model in Equation 5, the deviation $f$ between the average of each sample sets is bounded by the following:*

$$Pr(|f| \geq \epsilon) \leq 4d \exp\left(-\frac{\epsilon^2 n_i \hat{n}_i}{2(n_i + \hat{n}_i)}\right). \quad (7)$$

*Proof.* The Lipshitz constants for function $f$ are $c_k = 1/n_i$ for $k = 1, \ldots, n_i$, and $c_k = 1/\hat{n}_i$ otherwise. Although the input random variables are not identically distributed, they are independently sampled, so we can apply McDiarmid's Inequality [7] to obtain $$\Pr(f \geq t + E[f]) \leq \exp\left(-\frac{2t^2 n_i \hat{n}_i}{n_i + \hat{n}_i}\right)$$

$$\Pr(f \leq -t + E[f]) \leq \exp\left(-\frac{2t^2 n_i \hat{n}_i}{n_i + \hat{n}_i}\right). \quad (8)$$

Now, we need to bound the expected value of $E[f]$, which should be close to zero, but not exactly zero. Since our model explicitly defines the probability of $Y_{ij}$ given $\mu_i$ and $\nu_j$, we can write the expectation as $$E[f(Y_{i,1}, \ldots, Y_{i,n_i+\hat{n}_i})]$$

$$= E\left[\frac{1}{n_i}\sum_{j=1}^{n_i} Y_{ij} - \frac{1}{\hat{n}_i}\sum_{j=n_i+1}^{n_i+\hat{n}_i} Y_{ij}\right]$$

$$= \frac{1}{dn_i}\sum_{j=1}^{n_i} \bar{\mu}_i^T \bar{\nu}_j - \frac{1}{d\hat{n}_i}\sum_{j=n_i+1}^{n_i+\hat{n}_i} \bar{\mu}_i^T \bar{\nu}_j$$

$$= d\bar{\mu}_i^T \left(\frac{1}{n_i}\sum_{j=1}^{n_i} \bar{\nu}_j - \frac{1}{\hat{n}_i}\sum_{j=n_i+1}^{n_i+\hat{n}_i} \bar{\nu}_j\right)$$

Let $C$ denote the quantity of the vector inside the parentheses, $C = \left(\frac{1}{n_i}\sum_{j=1}^{n_i}\bar{\nu}_j - \frac{1}{\hat{n}_i}\sum_{j=n_i+1}^{n_i+\hat{n}_i}\bar{\nu}_j\right)$. Then we can bound each entry in $C$ using the same McDiarmid's Inequality.

$$\Pr(C(k) \geq \tau) \leq \exp\left(-\frac{2\tau^2 n_i \hat{n}_i}{n_i + \hat{n}_i}\right)$$

With some simple substitution, we have $$\Pr(\mu_i(k)C(k) \geq \tau) \leq \exp\left(-\frac{2\tau^2 n_i \hat{n}_i}{\mu_i(k)^2(n_i + \hat{n}_i)}\right).$$

Since we have no way of bounding $\mu_i$ in this sample, we assume $\mu_i = \bar{1}$ and apply the Union Bound over all dimensions, which provides the worst case bound $$\Pr(E[f] \geq \tau) \leq d \exp\left(-\frac{2\tau^2 n_i \hat{n}_i}{n_i + \hat{n}_i}\right). \qquad (9)$$

Finally, we combine the two bounds from Equations 8) and 9. First, let $$\frac{\delta}{2} = d\exp\left(-\frac{2\tau^2 n_i \hat{n}_i}{n_i + \hat{n}_i}\right). \qquad (10)$$

This is the right hand side of Equation 9 above. Therefore, the probability of $E[f] \geq \tau$ is at most $\delta/2$, for $$\tau = \sqrt{\frac{n_i + \hat{n}_i}{2n_i\hat{n}_i}\log\frac{2d}{\delta}}. \qquad (11)$$

Similarly, we can apply the same argument to the bound in Equation 8 by setting $$\frac{\delta}{2} = \exp\left(-\frac{2t^2 n_i \hat{n}_i}{n_i + \hat{n}_i}\right). \quad (12)$$

Then, Equation 8 states that, for the following value of $t$, the probability that $f \geq t + E[f]$ is at most $\delta/2$ $$t = \sqrt{\frac{n_i + \hat{n}_i}{2 n_i \hat{n}_i} \log \frac{2}{\delta}}. \quad (13)$$

We can plug Equations 13 and 11 into Eq. 8, which shows that with probability at most $\delta$, $$f \geq \sqrt{\frac{n_i + \hat{n}_i}{2 n_i \hat{n}_i} \log \frac{2}{\delta}} + \sqrt{\frac{n_i + \hat{n}_i}{2 n_i \hat{n}_i} \log \frac{2d}{\delta}}. \quad (14)$$

Define $\epsilon$ as:

$$\epsilon = \sqrt{\frac{n_i + \hat{n}_i}{2 n_i \hat{n}_i} \log \frac{2d}{\delta}} + \sqrt{\frac{n_i + \hat{n}_i}{2 n_i \hat{n}_i} \log \frac{2}{\delta}}.$$

We can rewrite $\delta$ in terms of $\epsilon$.

$$\delta = 2d \exp\left(-\frac{\left(\frac{2\epsilon^2 n_i \hat{n}_i}{n_i + \hat{n}_i} + \log(d)\right)^2}{4 \frac{2\epsilon^2 n_i \hat{n}_i}{n_i + \hat{n}_i}}\right)$$

Our target inequality is then the following.

$$\Pr(f \geq \epsilon) \leq 2d \exp\left(-\frac{\left(\frac{2\epsilon^2 n_i \hat{n}_i}{n_i + \hat{n}_i} + \log(d)\right)^2}{4\frac{2\epsilon^2 n_i \hat{n}_i}{n_i + \hat{n}_i}}\right)$$

Since we expect all data to have dimensionality of at least 1, dropping the logarithmic term only loosens our bound, and the inequality simplifies to $$\Pr(f \geq \epsilon) \leq 2d \exp\left(-\frac{\epsilon^2 n_i \hat{n}_i}{2(n_i + \hat{n}_i)}\right). \quad (15)$$

By symmetry, we have the following:

$$\Pr(|f| \geq \epsilon) \leq 4d \exp\left(-\frac{\epsilon^2 n_i \hat{n}_i}{2(n_i + \hat{n}_i)}\right). \quad (16)$$

This bounds the probability of the testing mean deviating from the training sample mean along a row of the rating matrix. Analogous bounds are easily derived for deviation along the columns by switching all user variables with product variables. These row and column bounds in the recommendation matrix are equivalent to in-degree and out-degree bounds in the bipartite graph case. □

3.2 DEVIATION DEGREE PRIORS

Although our derivations only guarantee an upper bound, we expect the formula in Equation 7 to be close to the true shape of the mean deviation distribution between training and testing data.

$$\Pr\left(\left|\frac{1}{n_i}\sum_{j=1}^{n_i} Y_{ij} - \frac{1}{\hat{n}_i}\sum_{j=n_i+1}^{n_i+\hat{n}_i} Y_{ij}\right| = \epsilon\right)$$
$$\approx \frac{1}{Z}\exp\left(-\frac{\epsilon^2 n_i \hat{n}_i}{2(n_i + \hat{n}_i)}\right) \quad (17)$$

In other words, we can use the following for our degree dependent potentials.

$$\psi(\deg(u_i, E_{\text{te}}^+) = k) = \frac{\left(\frac{1}{n_i}\deg(u_i, E_{\text{tr}}^+) - k/\hat{n}_i\right)^2 n_i \hat{n}_i}{2(n_i + \hat{n}_i)} \quad (18)$$

This potential is concave and fits nicely into our framework. By enforcing these degree/deviation distributions, we can post-process predicted ratings by using the original predictions as edge weights and using our bounds as the degree potentials.

4 EXPERIMENTS

4.1 GRAPH RECONSTRUCTION

One natural application of our model is graph reconstruction. For instance, consider the case where we are given noisy edge weights and want to reconstruct the original binary graph such that it obeys some reasonable degree distribution. In many situations, edge

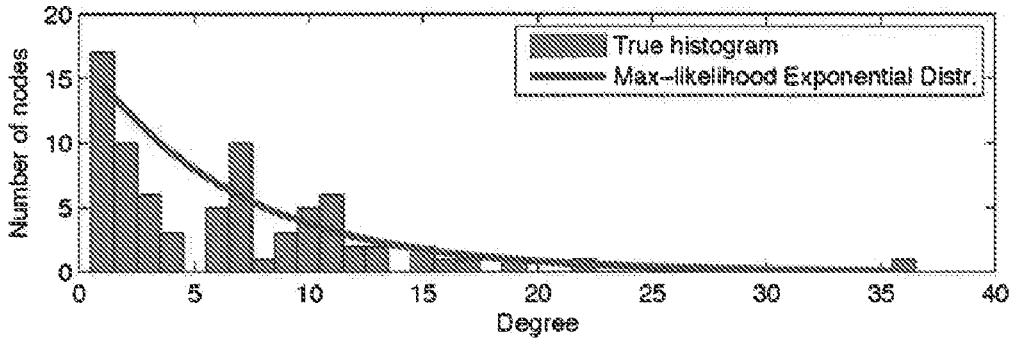

Figure 3: The true and learned degree distributions of a fictional social network of coappearance of 64 characters from the novel Les Misérables.

weights can be approximated by computing an affinity between node descriptors, for instance, by using a kernel function between vectors describing nodes. These edge weights can be inserted into our model $\Pr(\hat{E}|G)$ via the $\phi$ terms. However, we may also have useful information about the degree distribution our estimated subgraph should obey, which can be inserted into our model via the $\psi$ terms.

To simulate this scenario, we use a graph of coappearance of 64 characters in the novel Les Misérables [4]. We learn the maximum likelihood exponential distribution parameter $\lambda = (\sum_{v \in V} \deg(v))^{-1}$. The true degree distribution and the learned distribution are plotted in Figure 3.

Denote the adjacency matrix of the true coappearance graph by $A$. In other words, $A_{ij} = 1$ if there is an edge $E$ between node $i$ and node $j$ and otherwise $A_{ij} = 0$.

To mimic a noisy set of features for each node, we perform a spectral embedding of the graph. This induces features from the graph by using the leading eigenvectors of the adjacency matrix $A$. Figure 4 is a plot of the 2-dimensional spectral embedding with the original connectivity. We obtain a noisy approximation to the original $A$ matrix by computing an inner product (a linear kernel) between the induced node features, which are merely the top two eigenvectors of the spectral embedding. In other words, we keep only a low rank (rank 2) approximation $\tilde{A}$ of the original graph's adjacency matrix $A$, which is clearly insufficient to reconstruct the original graph. However, if we also combine this low rank approximation with information about degree distributions, it should be possible to perform more accurate reconstruction of the original graph $A$.

Therefore, we will use this kernel matrix (of inner products between very low dimensional features for each node) or low rank adjacency matrix $\tilde{A}$ to reconstruct the original graph structure. We set the $\phi$ potential functions to linear translations of the kernel:

$$\phi(v_i, v_j) \leftarrow \tilde{A}_{i,j} - \epsilon. \tag{19}$$

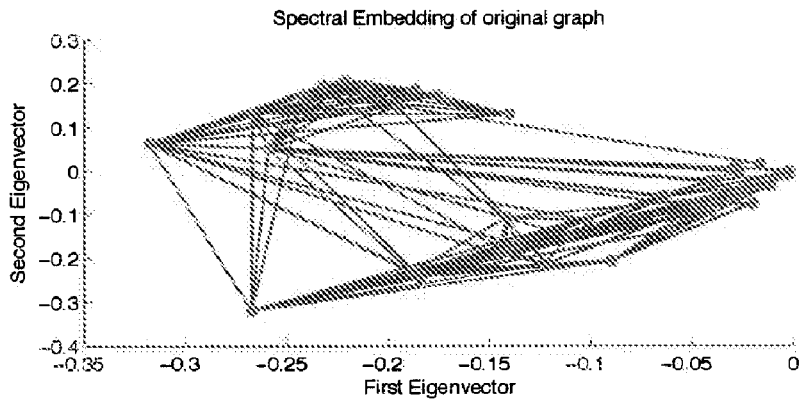

Figure 4: Two dimensional spectral embedding of Les Misérables graph. Two dimensions are clearly insufficient to represent the proper distances in this graph, so we should expect simple affinity thresholding to benefit from extra information.

We then find the most likely edge configuration under Equation 1. More specifically we are recovering the maximum weight $b$-matching using $\Pr(\hat{E}'|G')$. This gives us an estimate $\hat{E} = \arg\max_{\hat{E}} \Pr(\hat{E}|G)$ which we use to construct an adjacency matrix $\hat{A}$.

Using only $\tilde{A}$ and degree distribution information, we construct an adjacency matrix $\hat{A}$ that is potentially closer to the original matrix $A$. We compare our method, which includes the degree distribution information (the exponential degree model) to the naive scheme, which simply thresholds the $\phi$ or $\tilde{A}$ values to obtain a binary graph. Across all thresholds, our method using degree distributions produce the most accurate overall reconstruction, as shown in Figure 5.

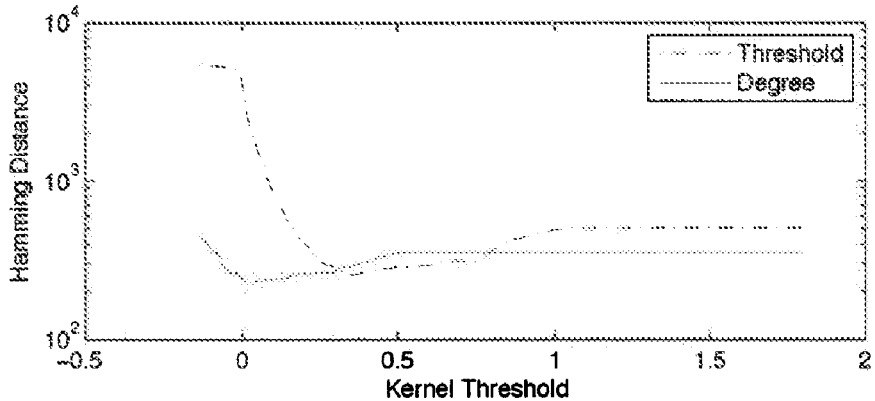

Figure 5: Hamming error of graph reconstruction using degree distributions versus simple thresholding. Error is displayed on a logarithmic scale.

4.2 COLLABORATIVE FILTERING

We use the degree potentials based on the concentration bound for preference matrices to post-process the ratings predicted by Fast Max-Margin Matrix Factorization (MMMF) [10]. In particular, we test our method on binarized versions of three datasets: Movielens, Eachmovie, and Jester. The Movielens data set contains about one million ratings (from 1 to 5) by 6,040 users for 3952 movies. The EachMovie data set contains 2,811,983 ratings (from 1 to 6) by 74,424 users for 1,648 movies. The Jester data set contains 1,810,455 ratings (from -10 to 10) by 24983 for 100 jokes.

Since these databases use multi-valued ratings, we threshold each to obtain binary ratings. We choose thresholds such that approximately half of all ratings are in each bin: 4 or greater for Movielens, 4 or greater for EachMovie, 0 or greater for Jester. These thresholds approximately correspond to unquantified, hit-or-miss recommendations. We use three random splits of the observed ratings into 50% training and 50% test.

After cross-validating to find the optimal regularization parameter for MMMF, we feed the output from MMMF into our system by instantiating each query rating as an edge, using the MMMF prediction as the edge weight (offset by the user thresholds). We then add the degree priors from Equation 18, scaled by a regularization constant, which allows us to adjust the strength of the degree prior. By setting the regularization scalar to zero, we have uniform degree priors and the problem becomes a straightforward thresholding, which is the standard output of MMMF. By cross-validation over the regularization constant by including some known ratings in the query edge set, we are able find a setting that improves on the testing accuracy of MMMF's output (on each split of each data set). Typically, running MMMF on these large data sets takes a few hours to complete, while our post-processing takes a few extra minutes. Since the problem becomes a bipartite $b$-matching, we can use fast belief propagation code to find the exact solution while taking full advantage of sparsity. Figure 6 and Table 1 report the results of these experiments.

5 DISCUSSION

We have provided a method to find the most likely graph from a distribution that uses edge weight information as well as degree-dependent distributions. The exact edge estimate is recovered in polynomial time by showing that the problem is equivalent to $b$-matching or the maximum weight degree constrained subgraph. These can be efficiently and exactly implemented using maximum flow and belief propagation methods. A limitation of the approach is that the degree distributions that can be modeled in this way must be log-concave. We have derived bounds for the deviation of degrees between training and testing data that fit our log-concavity requirement for degree priors and demonstrated that adding these priors improves accuracy on recommendation matrix prediction. Many steps in our derivation loosen these bounds significantly for the sake of simplicity [2], but further improvement may be achieved by using tighter bounds.

---

[2] We can apply McDiarmid's Inequality to avoid the drastic Union Bound in Equation 8, but the result is not as clean.

|  | Movielens | | EachMovie | | Jester | |
| --- | --- | --- | --- | --- | --- | --- |
|  | MMMF | Deg. | MMMF | Deg. | MMMF | Deg. |
| Split 1 | 0.2835 | 0.2834 | 0.3005 | 0.2947 | 0.2768 | 0.2721 |
| Split 2 | 0.2789 | 0.2788 | 0.2993 | 0.2910 | 0.2769 | 0.2724 |
| Split 3 | 0.2780 | 0.2776 | 0.3004 | 0.2913 | 0.2770 | 0.2724 |
| Average | 0.2801 | 0.2799 | 0.3001 | 0.2923 | 0.2769 | 0.2723 |
|  | ± 0.003 | ± 0.002 | ± 0.001 | ± 0.002 | ± .0001 | ± .0002 |

Table 1: Zero-one error on three splits of the three data sets. Errors reported are on the held-out test set using the regularization parameter that scored highest on a separate cross-validation set. Deg. refers to our degree prior post-processing. We provide a small improvement on every split as well as the average score and a larger relative improvement on the two larger data sets.

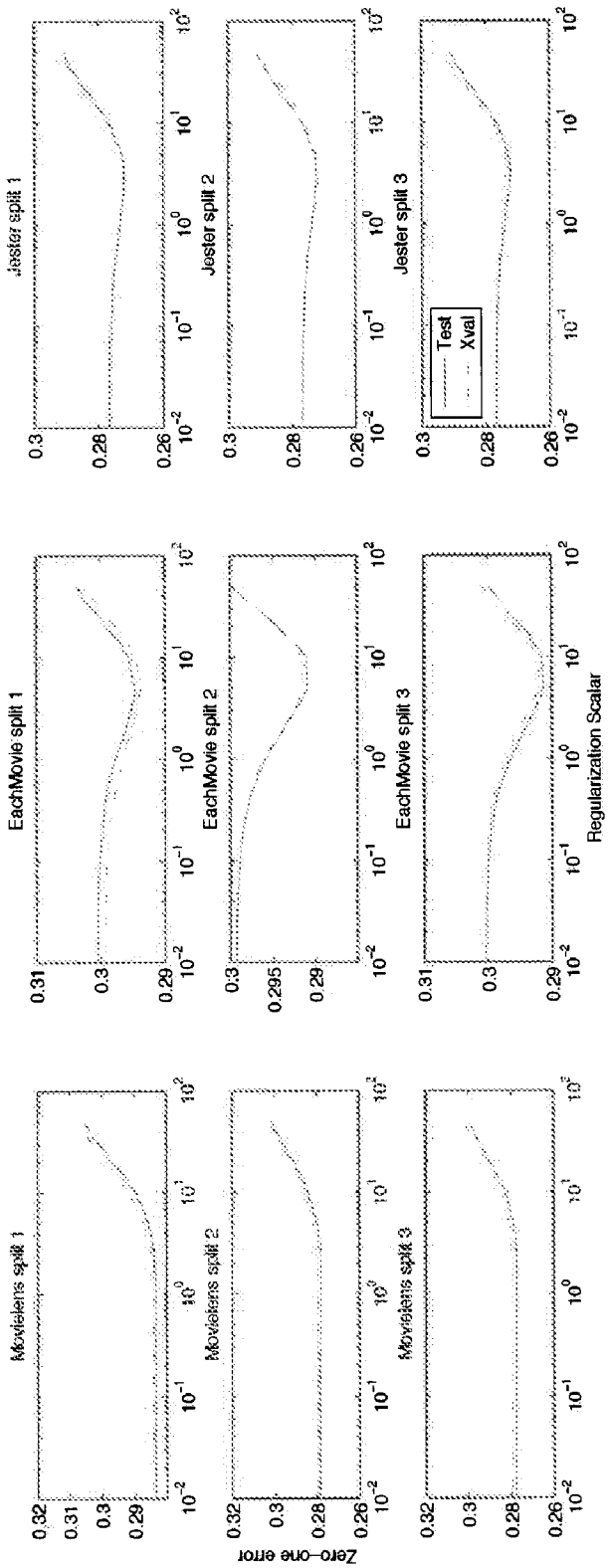

Figure 6: Cross-validation and testing errors at different settings of regularization parameter. The leftmost point on each line corresponds to a regularization parameter of zero, which is the baseline Max-Margin Matrix Factorization output. The improvement our method provides is more pronounced in the two larger data sets, EachMovie and Jester. See Table 1 for the numerical scores.

References

[1] M. Bayati, D. Shah, and M. Sharma. Maximum weight matching via max-product belief propagation. In *Proc. of the IEEE International Symposium on Information Theory*, 2005.

[2] C. Fremuth-Paeger and D. Jungnickel. Balanced network flows. i. a unifying framework for design and analysis of matching algorithms. *Networks*, 33(1):1–28, 1999.

[3] B. Huang and T. Jebara. Loopy belief propagation for bipartite maximum weight b-matching. In *Artificial Intelligence and Statistics (AISTATS)*, 2007.

[4] Donald E. Knuth. The stanford graphbase: a platform for combinatorial algorithms. In *SODA '93: Proceedings of the fourth annual ACM-SIAM Symposium on Discrete algorithms*, pages 41–43, Philadelphia, PA, USA, 1993. Society for Industrial and Applied Mathematics.

[5] B. Marlin. Modeling user rating profiles for collaborative filtering. In *Advances in Neural Information Processing Systems 17*. MIT Press, 2004.

[6] B. Marlin, R. Zemel, S. Roweis, and M. Slaney. Collaborative filtering and the missing at random assumption. In *Proceedings of UAI 2007*, 2007.

[7] Colin McDiarmid. On the method of bounded differences. *Surveys in Combinatorics*, page 148188, 1989.

[8] Quaid D. Morris and Brendan J. Frey. Denoising and untangling graphs using degree priors. In *Advances in Neural Information Processing Systems 16*. MIT Press, Cambridge, MA, 2003.

[9] T. Jaakkola N. Srebro, J. Rennie. Maximum-margin matrix factorization. In *Advances in Neural Information Processing Systems 17*. MIT Press, Cambridge, MA, 2004.

[10] J. Rennie and N. Srebro. Fast maximum margin matrix factorization for collaborative prediction. In *ICML '05: Proceedings of the 22nd international conference on Machine learning*, pages 713–719, New York, NY, USA, 2005. ACM.

[11] S. Sanghavi, D. Malioutov, and A. Willsky. Linear programming analysis of loopy belief propagation for weighted matching. In *Advances in Neural Information Processing Systems 20*, pages 1273–1280. MIT Press, Cambridge, MA, 2008.

[12] N. Srebro and T. Jaakkola. Weighted low rank approximation. In *Proceedings of the 22nd international conference on Machine learning*, 2003.

What is claimed is:

1. A computer readable medium having software instructions stored thereon for matching an advertisement with a key term using belief propagation, the software instructions, when executed by a processor, cause the processor to perform operations comprising:
   identifying a predetermined number of advertiser nodes matching a selected key term node;
   updating a belief value corresponding to each neighboring advertiser node of a selected key term node in a graph data structure by passing messages between neighboring nodes until a termination condition is met, each message being based on profit matrix values and received messages, where a data content of each message is determined according to a compressed message update process;
   the compressed message update process comprising calculating one or more intermediate values for each neighboring advertiser node of a selected key term node that is based on exponentiated profit matrix values and received messages, sorting the one or more intermediate values, selecting an intermediate value from the one or more intermediate values based on the predetermined number of advertiser nodes matching the selected key term node, and calculating a new message based on the exponentiated profit matrix values, the received messages, and the selected intermediate value;
   the passing messages including applying data signals to and receiving signals from a multiprocessor data input/output system;
   storing each updated belief value and each received message in an electronic storage associated with the selected key term node;
   selecting the predetermined number of advertiser nodes matching the selected key term node, the matching based on updated belief values of advertiser nodes neighboring the selected key term node; and
   outputting the selected advertiser nodes.

2. The computer readable medium of claim 1, wherein the data content of each message is a single scalar value.

3. The computer readable medium of claim 2, wherein the single scalar value corresponds to a potential matching of the selected key term node with a respective one of its neighboring advertiser nodes.

4. The computer readable medium of claim 3, wherein the single scalar value includes a profit matrix value corresponding to a potential matching of the selected key term node and the respective one of the neighboring nodes and a value of a message received by that respective neighbor node from another node and a profit matrix value corresponding to a potential matching between the respective neighbor node and the other node.

5. The computer readable medium of claim 1, wherein the software instructions are adapted for use on distributed processors.

6. A distributed processing system for matching advertisements with search terms using belief propagation, the system comprising:
   a plurality of processors each corresponding to a node of a graph data structure having advertisement nodes and search term nodes where each advertisement node is a neighbor to at least one search term node;
   a network coupling the plurality of processors and adapted to transfer messages between the processors;
   wherein each processor is adapted to load and execute software instructions stored on a computer readable medium, the software instructions, when executed, cause the processor to perform operations including:
   identifying a predetermined number of advertiser nodes matching a selected search term node;
   updating belief values corresponding to its respective neighbor nodes by passing messages between neighboring nodes until a termination condition is met, a data content of each message being based on profit matrix values and received messages, where a data content of each message is determined according to a message update process;
   the compressed message update process comprising calculating one or more intermediate values for each neighboring advertiser node of a selected search term node that is based on exponentiated profit matrix values and received messages, sorting the one or more intermediate values, selecting an intermediate value from the one or more intermediate values based on the predetermined number of advertiser nodes matching the selected search term node, and calculating a new message based on the exponentiated profit matrix values, the received messages, and the selected intermediate value;
   storing each updated belief value and each received message in an electronic storage associated with the respective processor;
   selecting the predetermined number of matching neighbor nodes, the matching being determined based on updated belief values of neighbor nodes; and
   outputting the selected matching neighbor nodes.

7. The distributed processing system of claim 6, wherein the data content of each message is a single scalar value.

8. The distributed processing system of claim 7, wherein the single scalar value corresponds to a potential matching of the selected search term node with a respective one of its neighboring advertiser nodes.

9. The distributed processing system of claim 8, wherein the single scalar value includes a profit matrix value corresponding to a potential matching of the selected search term node and the respective one of the neighboring nodes and a value of a message received by that respective neighbor node from another node and a profit matrix value corresponding to a potential matching between the respective neighbor node and the other node.

10. The distributed processing system of claim 6, wherein each profit matrix value represents a profit amount associated with an edge between neighboring nodes.

11. The distributed processing system of claim 6, wherein the updating is performed iteratively until the termination condition is met.

12. The distributed processing system of claim 6, wherein the termination condition is a predetermined number of iterations of the updating.

13. The distributed processing system of claim 6, wherein the termination condition is defined as receiving no changed message values within a predetermined period of time.

14. The distributed processing system of claim 6, wherein the termination condition is a number of messages sent from each node.

15. The distributed processing system of claim 6, wherein the termination condition is an elapsing of a predetermined period of time.

16. The distributed processing system of claim 6, wherein the termination condition is defined as the earliest occurrence of one of receiving no changed message values within a first predetermined period of time and an elapsing of a second predetermined period of time.

17. A computerized method for matching advertisements with search terms using belief propagation, the method comprising:
   providing a bipartite graph data structure having a plurality of advertiser nodes and a plurality of search term nodes, where each advertiser node is connected to a corresponding search term node by an edge;
   providing a profit matrix having a profit for each edge of the bipartite graph data structure;
   identifying a predetermined number of advertiser nodes matching a selected search term node;
   updating, with a processor adapted to perform belief propagation generalized matching, a belief value corresponding to each advertiser node connected to a selected search term node by passing messages between adjacent nodes until a termination condition is met, each message being based on profit matrix values and received messages, where a data content of each message is determined according to a compressed message update process;
   the compressed message update process comprising calculating one or more intermediate values for each neighboring advertiser node of a selected search term node that is based on exponentiated profit matrix values and received messages, sorting the one or more intermediate values, selecting an intermediate value from the one or more intermediate values based on the predetermined number of advertiser nodes matching the selected search term node, and calculating a new message based on the exponentiated profit matrix values, the received messages, and the selected intermediate value;
   storing each updated belief value and each received message in an electronic storage associated with the corresponding advertiser node;
   selecting the predetermined number of advertiser nodes matching each search term node of a group of search term nodes of interest, the matching being determined based on updated belief values of advertiser nodes adjacent to each search term node of interest; and
   outputting the selected advertiser nodes matching each search term node of interest.

18. The method of claim 17, further comprising displaying advertisements associated with each of the selected advertiser nodes on a search results page corresponding to the search term node associated with the selected advertiser nodes.

19. The method of claim 17, further comprising storing at each advertiser node and at each search term node a portion of the profit matrix, where each portion is selected based on adjacent nodes of each respective advertiser node and each respective search term node.

20. The method of claim 17, wherein the compressed message update process generates a message that includes $$\hat{\mu}_{x_i y_j} = \frac{\exp(A_{ij})}{\exp(A_{i\ell})\hat{\mu}_{y_\ell x_i}}$$

where u refers to the plurality of advertiser nodes, where $x_i = M(u_i)$, where $u_i$ represents an advertiser node of the plurality of advertiser nodes u, where M is a function that returns a set of neighbor nodes of an input node, where $M(u_i)$ returns a set of neighbor search term nodes of the advertiser node $u_i$, where v refers to the plurality of search term nodes, where $y_j = M(v_j)$, where $v_j$ represents a search term node of the plurality of search term nodes v, where $M(v_j)$ returns a set of neighbor advertiser nodes of the search term node $v_j$, where $(u_i, v_j)$ refers to a matching of the advertiser node $u_i$ and the search term node $v_j$, where A is a weight matrix and $A_{ij}$ represents a weight of edge $v_j$ and the index l refers to the b th greatest setting of k for the term $\exp(A_{ik}) m_{yk}(x_i)$, where b represents a predetermined number of advertiser nodes of the plurality of advertiser nodes u matching each search term node of the plurality of search term nodes v, where m represents a message, and where $k \neq j$.

21. The method of claim 17, wherein the updating and storing are performed using parallel processing.

22. The method of claim 17, wherein each profit represents a profit on placement of an advertisement by an advertiser associated with the advertisement.

23. The method of claim 17, wherein the updating is performed iteratively until the termination condition is met.

24. The method of claim 17, wherein the termination condition is a predetermined number of iterations of the updating.

25. The method of claim 17, wherein the termination condition is defined as a steady state of updated belief values during a predetermined period of time.

* * * * *